US012720248B2

(12) United States Patent

Kang et al.

(10) Patent No.: US 12,720,248 B2
(45) Date of Patent: Aug. 25, 2026

(54) ELECTRONIC DEVICE COMPRISING OPENING/CLOSING STRUCTURE

(71) Applicant: SAMSUNG ELECTRONICS CO., LTD., Suwon-si (KR)

(72) Inventors: Yoonseok Kang, Suwon-si (KR); Yongbum Kim, Suwon-si (KR); Changhyung Lee, Suwon-si (KR); Hwangyun Cho, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 91 days.

(21) Appl. No.: 18/915,562

(22) Filed: Oct. 15, 2024

(65) Prior Publication Data

US 2025/0039594 A1 Jan. 30, 2025

Related U.S. Application Data

(63) Continuation of application No. PCT/KR2023/003828, filed on Mar. 23, 2023.

(30) Foreign Application Priority Data

Apr. 15, 2022 (KR) ........................ 10-2022-0046645
May 13, 2022 (KR) ........................ 10-2022-0058844

(51) Int. Cl.
*H04R 1/1025* (2026.01)
*H04R 1/10* (2026.01)

(52) U.S. Cl.
CPC ......... *H04R 1/1025* (2013.01); *H04R 1/1091* (2013.01); *H04R 2201/10* (2013.01)

(58) Field of Classification Search
CPC . H04R 1/1025; H04R 1/1091; H04R 2201/10
(Continued)

(56) References Cited

U.S. PATENT DOCUMENTS 10,582,287 B2 * 3/2020 Song .................... H04R 1/1025
11,115,746 B1 9/2021 Morrison et al.
(Continued)

FOREIGN PATENT DOCUMENTS

CN 207306295 U 5/2018
CN 209659530 U 11/2019
(Continued)

OTHER PUBLICATIONS

Extended European Search Report corresponding to Application No. 23788486.1-1218; Dated May 30, 2025.
(Continued)

*Primary Examiner* — Sean H Nguyen
(74) *Attorney, Agent, or Firm* — CANTOR COLBURN LLP

(57) ABSTRACT

An electronic device includes a first body comprising a first anti-rotation surface; an opening/closing structure; a second body connected to the first body via the opening/closing structure; and an accommodation space formed by the first body and the second body. The opening/closing structure may comprise a hinge member, at least one contact area, a guide member, and an elastic member, and may switch from a first state, in which the accommodation space is closed, to a second state, in which the accommodation space is opened, depending on a position in which the guide member and the at least one contact area are in contact. At least a portion of the first anti-rotation surface may be in contact with a second anti-rotation surface while the accommodation space is maximally opened.

20 Claims, 23 Drawing Sheets

(58) Field of Classification Search
USPC .......................................................... 381/370
See application file for complete search history.

(56) References Cited

U.S. PATENT DOCUMENTS

| | | | |
|---|---|---|---|
| 2007/0281752 | A1 | 12/2007 | Lewis |
| 2017/0094397 | A1 | 3/2017 | Wagman et al. |
| 2019/0069066 | A1 | 2/2019 | Song et al. |
| 2019/0272800 | A1 | 9/2019 | Tao et al. |
| 2020/0107102 | A1 | 4/2020 | Sang et al. |
| 2021/0112672 | A1* | 4/2021 | Cazalet ............... E05D 11/1028 |
| 2022/0183432 | A1 | 6/2022 | Kang et al. |
| 2022/0342457 | A1* | 10/2022 | Kwon ................... G06F 1/1681 |
| 2022/0369008 | A1 | 11/2022 | Kim |
| 2023/0092360 | A1 | 3/2023 | Cai |

FOREIGN PATENT DOCUMENTS

| | | | | |
|---|---|---|---|---|
| CN | 111513445 | A | 8/2020 | |
| CN | 212811339 | U | 3/2021 | |
| CN | 214799849 | U | 11/2021 | |
| CN | 113810810 | A | 12/2021 | |
| CN | 113993027 | A * | 1/2022 | ........... A45C 11/001 |
| CN | 116085378 | A * | 5/2023 | .............. F16C 11/04 |
| CN | 113993027 | B | 11/2024 | |
| JP | 3236912 | B2 | 12/2001 | |
| JP | 3236912 | U | 3/2022 | |
| KR | 20190021033 | A | 3/2019 | |
| KR | 102166637 | B1 | 10/2020 | |
| KR | 20210065917 | A | 6/2021 | |
| KR | 20210098774 | A | 8/2021 | |
| KR | 20210135176 | A | 11/2021 | |
| PH | 12019502466 | B1 * | 6/2024 | |

OTHER PUBLICATIONS

Indian Office Action; Indian Application No. 202417077655; Report Mail Date: Mar. 11, 2026; 7 pages.

* cited by examiner

ELECTRONIC DEVICE COMPRISING OPENING/CLOSING STRUCTURE

TECHNICAL FIELD

The disclosure relates to an electronic device including an opening/closing structure.

BACKGROUND ART

As an opening/closing structure of a charging cradle configured to accommodate wireless earphones, a structure using magnets, a structure using friction, or a structure using tension of an injection-molded product may be used.

The structure using magnets uses the repulsive force of a pair of magnets to keep the lid open, and uses the attractive force of another pair of magnets to keep the lid closed. The structure using magnets may maintain an opened or closed state using the attractive force of a pair of different magnets.

The structure using friction may be implemented such that the opening or closing operation of a lid is freely stopped by the friction between an injection-molded product and a rubber or silicone-based product.

The structure using tension caused by deformation of an injection-molded product may maintain the opened state of the lid by including a ledge on the injection-molded product.

DISCLOSURE OF INVENTION

Technical Problem

The structure using magnets has weak holding power in the opened and closed states, and the lid may rattle or move when switching to the opened state. Additionally, a defect may occur due to the inflow or penetration of iron powder around the product.

In the structure using friction, a manufacturing tolerance for maintaining an appropriate feeling of friction may be difficult to maintain, and repeated friction may reduce the durability of the device after long-term use and change the operation feeling. With the structure using friction, semi-automatic operation may not be possible.

In the structure using the tension of an injection-molded product, the injection-molded product may be permanently deformed when remaining in the opened state for a long period time, and thus the tension and operating feeling of the opening/closing structure may be deteriorated. In addition, it may be necessary to attach anti-movement tape to prevent movement during operation.

Embodiments of the disclosure are to provide an electronic device including an opening/closing structure in which the operation feeling of the opening/closing structure can be ensured while occurrence of movement is prevented during operation.

Solution to Problem

An electronic device according to an embodiment of the disclosure may include a first body including a first anti-rotation surface in at least a portion thereof, an opening/closing structure, a second body connected to the first body via the opening/closing structure, and an accommodation space defined by the first body and the second body. The opening/closing structure may include a hinge member disposed on the second body and having a second anti-rotation surface at least a portion thereof, the first body being rotatably connected to the hinge member, a contact area provided at one end of the first body and at least partially disposed on the hinge member, a guide member disposed in the hinge member and having a first area, a second area, and a concave area between the first area and the second area, the guide member being configured to come into contact with the contact area in the first area, the second area, or the concave area, and an elastic member configured to elastically transmit force to the guide member. Depending on a position where the guide member and the contact area are in contact with each other, a first state in which the accommodation space is closed is switched to a second state in which the accommodation space is opened, and when the accommodation space is fully opened, at least a portion of the first anti-rotation surface may be in contact with the second anti-rotation surface.

An opening/closing structure according to an embodiment of the disclosure includes a body including a first anti-rotation surface in at least a portion thereof and a contact area provided at one end, a hinge member rotatably connected to the body and including a second anti-rotation surface in at least a portion thereof, a guide member disposed in the hinge member and including a first area, a second area, and a concave area between the first area and the second area, the guide member being configured to come into contact with the contact area in the first area, the second area, or the concave area, and an elastic member configured to elastically transmit force to the guide member. Depending on the position where the guide member and the contact area contact are in contact with each other, a first state in which the body becomes closer to the hinge member may be switched to a second state in which the body becomes farther away from the hinge member, and at least a portion of the first anti-rotation surface may be in contact with the second anti-rotation surface when the body becomes farthest away from the hinge member.

Advantageous Effects of Invention

An electronic device including the opening/closing structure according to an embodiment of the disclosure can be semi-automatically operated and can maintain the operation feeling of the opening/closing structure even after repeated opening/closing operations.

An electronic device including the opening/closing structure according to an embodiment of the disclosure can prevent occurrence of movement in the opened state of the electronic device by including an anti-rotation surface.

MODE FOR THE INVENTION

Figure 1:
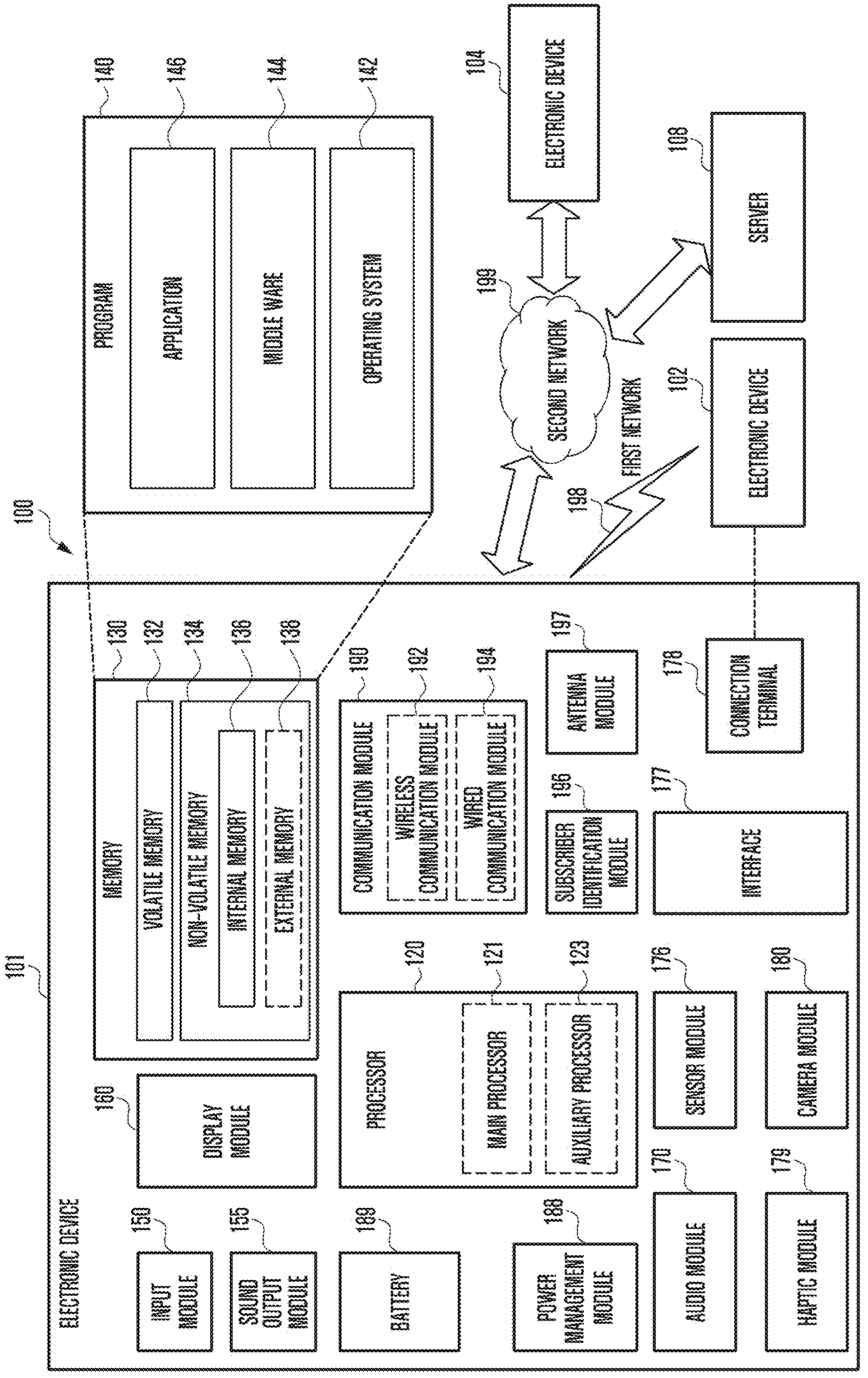
FIG. 1 is a block diagram of an electronic device according to an embodiment in a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) May be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
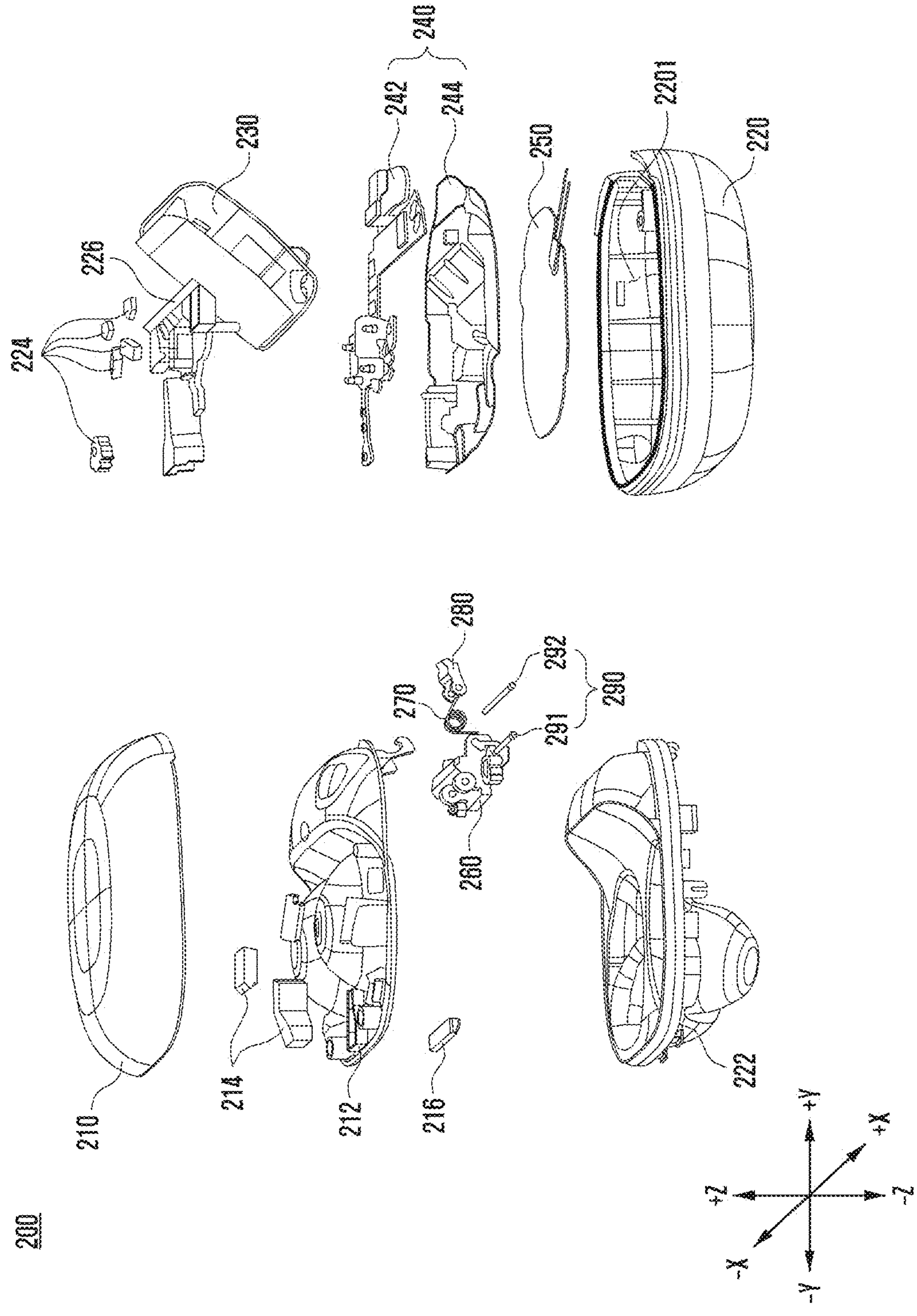
FIG. 2 is an exploded perspective view of an electronic device according to an embodiment of the disclosure.

FIG. 2 is an exploded perspective view of an electronic device 200 according to an embodiment of the disclosure. The electronic device 200 of FIG. 2 may be at least partially similar to the electronic device 101 of FIG. 1 or may further include different embodiments.

The electronic device 200 according to an embodiment of the disclosure may include a first body 210, a first seating unit 212, a first magnet 214, a stopper member 216, a second body 220, a second seating unit 222, a second magnet 224, a support member 226, a battery 230, a printed circuit board unit 240, a reception coil 250, a hinge member 260, an elastic member 270, a guide member 280, and/or a shaft 290.

In an embodiment, the electronic device 200 may be a device that is capable of accommodating an external electronic device (e.g., wireless earphones).

In an embodiment, the electronic device 200 may accommodate an external electronic device (e.g., wireless earphones) and supply power to the external electronic device (e.g., wireless earphones).

In an embodiment, the first body 210 may include a cover surface that may serve as a cover for the electronic device 200. The inside of the electronic device 200 may be opened or closed depending on a change in the position of the first body 210.

In an embodiment, the first seating unit 212 may be manufactured separately from the cover surface of the first body 210 and then disposed in a space provided inside the first body 210.

In an embodiment, the second body 220 may have at least a partially open shape. For example, the second body 220 may include an installation space 2201 within which the second seating unit 222 may be disposed.

Figure 3A:
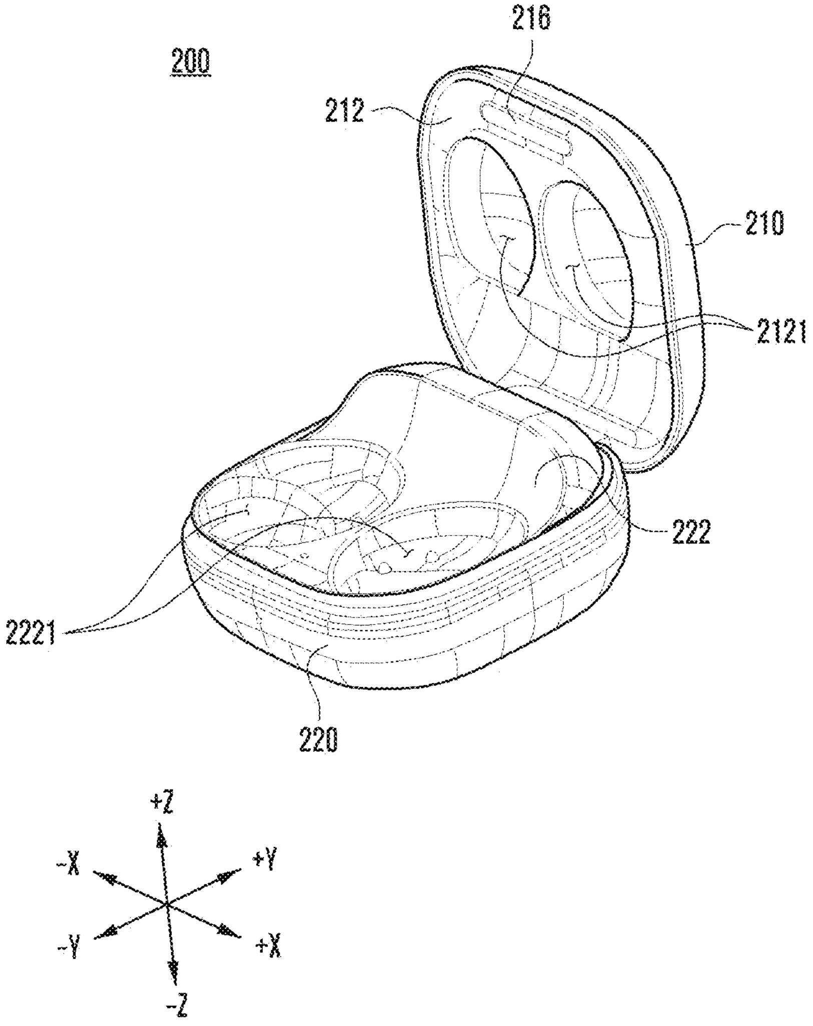
FIGS. 3A and 3B are perspective views of an electronic device according to an embodiment of the disclosure.

In an embodiment, the first seating unit 212 may include a first seating space 2121 (see FIG. 3A). The second seating unit 222 may include a second seating space 2221 (see FIG. 3A). An external electronic device (e.g., wireless earphones) may be disposed in a space defined by the first seating space 2121 (see FIG. 3A) and the second seating space 2221 (see FIG. 3A).

In an embodiment, the electronic device 200 may include the first magnet 214 and/or the second magnet 224. The first magnet 214 may be disposed inside the first body 210. The second magnet 224 may be disposed inside the second body 220.

In an embodiment, when the distance between the first magnet 214 and the second magnets 224 of the electronic device 200 is less than or equal to a predetermined distance, an attractive force may act between the first magnet 214 and the second magnet 224. For example, when the distance between the first body 210 and the second body 220 becomes closer to each other, the distance between the first magnet 214 and the second magnet 224 may become closer to each other so that an attractive force acts on the first and second magnets.

In an embodiment, the support member 226 may be disposed between the second seating unit 222 and the printed circuit board unit 240. For example, the second seating unit 222 may be disposed in one direction of the support member 226 (e.g., the +Z-axis direction), and the printed circuit board unit 240 may be disposed in another direction of the support member 226 (e.g., the −Z-axis direction). The support member 226 may serve to support the second seating unit 222.

In an embodiment, when the inside of the electronic device 200 is closed and the first body 210 and the second body 220 become closer to each other, the stopper member 216 may come into contact with at least a portion of the second seating unit 222.

In an embodiment, the printed circuit board unit 240 may include an installation area 242 and a board placement area 244. The installation area 242 may be an area where the hinge member 260 is disposed. The installation area 242 may include a printed circuit board in at least a portion thereof. The installation area 242 may be disposed in one direction (e.g., the +z-axis direction) of the substrate placement area 244.

In an embodiment, the reception coil 250 may be disposed in at least a portion of the installation space 2201 of the second body 220. The reception coil 250 may receive power from an external power transmission device (not illustrated).

In an embodiment, an elastic member 270 may be disposed on at least a portion of the hinge member 260. The elastic member 270 may be in contact with at least a portion of the guide member 280, and transmit elastic force to the guide member 280.

In an embodiment, the clastic member 270 may be an elastic torsion spring with elastic force. The elastic torsion spring is able to generate elastic force (e.g., rotational moment) in a direction opposite to the direction in which the spring is twisted.

In an embodiment, at least a portion of the guide member 280 may be in contact with the first body 210. The guide member 280 may transmit elastic force to the first body 210 and serve to guide a change in position of the first body 210. For example, since at least a portion of the first body 210 is in contact with the guide member 280, the position of the first body 210 may be changed according to the shape of the guide member 280.

In an embodiment, the shaft 290 may include a first shaft 291 and/or a second shaft 292. The hinge member 260, the elastic member 270, and the guide member 280 may be connected to each other via the first shaft 291. The hinge member 260 may be connected to at least a portion of the first body 210 via the second shaft 292.

In an embodiment, the battery 230 may refer to the battery 189 illustrated in FIG. 1. The battery 230 is capable of supplying power to at least one component of the electronic device 200.

FIG. 3A is a perspective view of an electronic device 200 according to an embodiment of the disclosure.

Figure 3B:
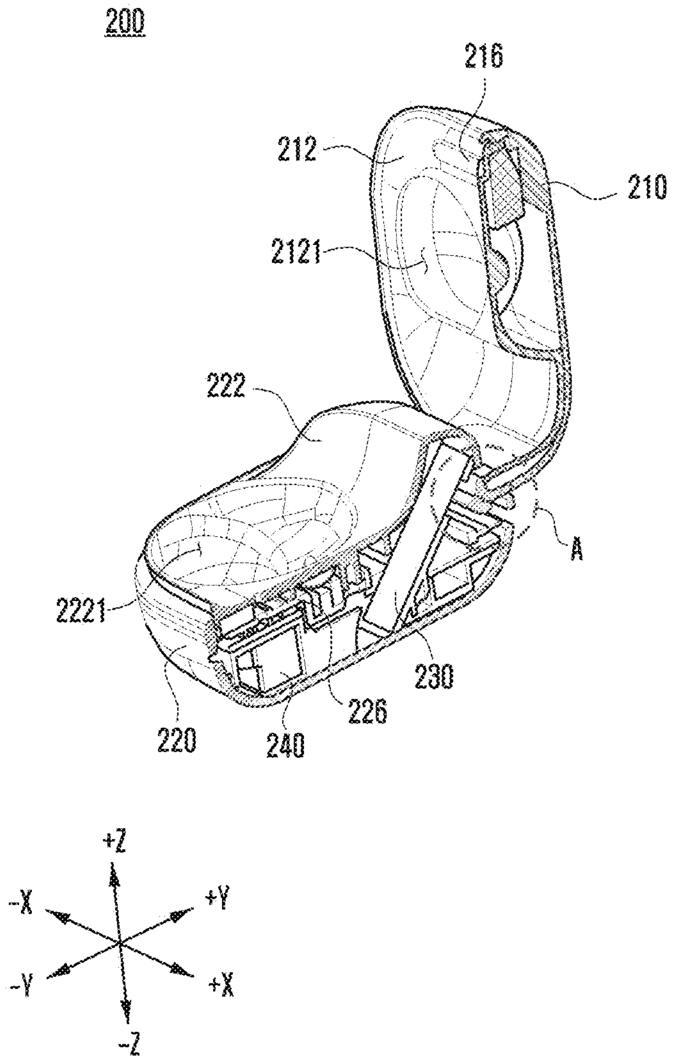

FIG. 3B is a perspective view illustrating the inside of the electronic device 200 according to an embodiment of the disclosure.

In an embodiment, the length direction of the electronic device 200 may refer to the y-axis direction, and the width direction of the electronic device 200 may refer to the x-axis direction. The height direction of the electronic device 200 may refer to the z-axis direction.

Referring to FIGS. 3A and 3B, the electronic device 200 may include a first body 210 and/or a second body 220.

In an embodiment, the first body 210 and the second body 220 may define an accommodation space in which an external electronic device (e.g., wireless earphones (not illustrated)) is disposed. For example, the accommodation space may refer to a space defined inside the first body 210 and the second body 220, or a space defined by the first seating space 2121 of the first seating unit 212 and the second space 2221 of the second seating unit 222.

In an embodiment, the first body 210 may serve as a cover for the accommodation space. For example, an external electronic device (not illustrated) may be disposed inside the second body 220, and the first body 210 may serve to cover the external electronic device (not illustrated) disposed in the second body 220.

In an embodiment, the first body 210 may have a lid shape that is at least partially closed. Depending on the change of the relative positions of the first body 210 and the second body 220, the accommodation space in the electronic device 200 may be opened or closed.

In an embodiment, the closed state of the electronic device 200 may refer to the state in which the first body 210 and the second body 220 become closer to each other so that the accommodation space (e.g., the first seating space 2121 and the second seating space 2121) of the electronic device 200 is completely closed. The opened state of the electronic device 200 may refer to the state in which the first body 210 and the second body 220 become farther away from each other so that the accommodation space in the electronic device 200 is opened to the maximum.

In an embodiment, the first seating unit 212 may be disposed in at least a portion of the first body 210. For example, the first seating unit 212 may be disposed in the space provided inside the first body 210.

In an embodiment, the first seating unit 212 may include a first seating space 2121. The first seating space 2121 may be a space in which at least a portion of the first seating unit 212 has a recessed shape on one surface. The first seating unit 212 may include two first seating spaces 2121. An external electronic device (e.g., wireless earphones) may be at least partially disposed in the first seating spaces 2121.

In an embodiment, the second seating unit 222 may be disposed in at least a portion of the first body 220. For example, the second seating unit 222 may be disposed in a space (e.g., the installation space 2201 (see FIG. 2)) provided inside the second body 220.

In an embodiment, the second body 220 may include a surface surrounding the outer edge of the second seating unit 222. A plurality of surfaces included in the second body 220 may extend in the length, width, and height directions of the electronic device 200, respectively. For example, respective surfaces of the second body 220 may extend in the length direction and height direction, the width direction and height direction, or the length direction and width direction of the electronic device 200.

In an embodiment, the second seating unit 222 may include a second seating space 2221. The second seating space 2221 may be a space in which at least a portion of the second seating unit 222 has a recessed shape on one surface. The second seating unit 222 may include two second seating spaces 2221. An external electronic device (e.g., wireless earphones (not illustrated)) may be at least partially disposed in the first seating spaces 2221.

In an embodiment, the first seating space 2121 and the second seating space 2221 may define an accommodation space in which an external electronic device (e.g., wireless earphones (not shown)) is disposed.

Referring to FIG. 3B, a printed circuit board unit 240, a support member 226, and a battery 230 may be disposed in a space (e.g., the installation space 2201 (see FIG. 2)) provided inside the second body 220. The second seating unit 222 is disposed in at least a portion of the second body 220, and the installation space 2201 (see FIG. 2) may be surrounded by the second body 220 and the second seating unit 222.

In an embodiment, the second seating unit 222 may be disposed in one direction of the support member 226 and the battery 230 (e.g., the +z-axis direction). For example, the second seating unit 222 may be located in the height direction of the electronic device 200 (e.g., the +z-axis direction) with respect to the support member 226 and the battery 230.

Referring to FIG. 3B, an opening/closing structure (A) may be disposed in at least a portion of the first body 210 and the second body 220. For example, the opening/closing structure (A) may be disposed at one end of the first body 210 and one end of the second body 220 in contact with the one end of the first body 210 (e.g., the distal end of the second body 220 located in the +y-axis direction). For example, the opening/closing structure (A) may include a contact area 217 (see FIG. 4A) of the first body 210, a hinge member 260 (see FIG. 2), an elastic member 270 (see FIG. 2), and a guide member 280 (see FIG. 2), and/or a shaft 290 (see FIG. 2).

In an embodiment, the first body 210 and the second body 220 may be connected to each other via the opening/closing structure (A). The opening/closing structure (A) may switch the electronic device 200 to an opened or closed state by moving the relative position of the first body 210 with respect to the second body 220.

In an embodiment, the first body 210 may be rotated around the opening/closing structure (A). For example, the first body 210 may be rotated around the opening/closing structure (A) in a direction toward the second body 220 or in a direction away from the second body 220.

In an embodiment, when the first body 210 is rotated in the direction toward the second body 220, the first seating space 2121 and the second seating space 2221 may be blocked from the outside.

In an embodiment, when the first body 210 is rotated in the direction away from the second body 220, the first seating space 2121 and the second seating space 2221 may be opened.

Figure 4A:
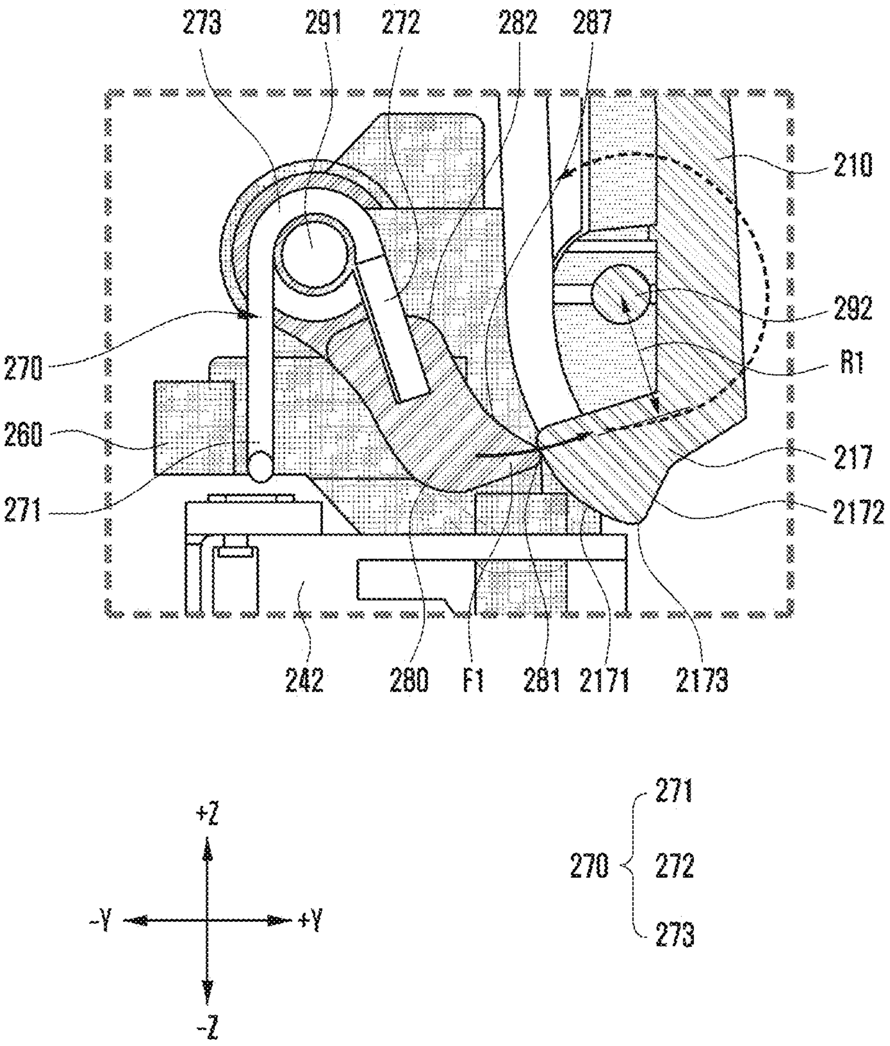
FIGS. 4A to 4E are views illustrating an opening/closing structure of an electronic device according to an embodiment of the disclosure.
Figure 4B:
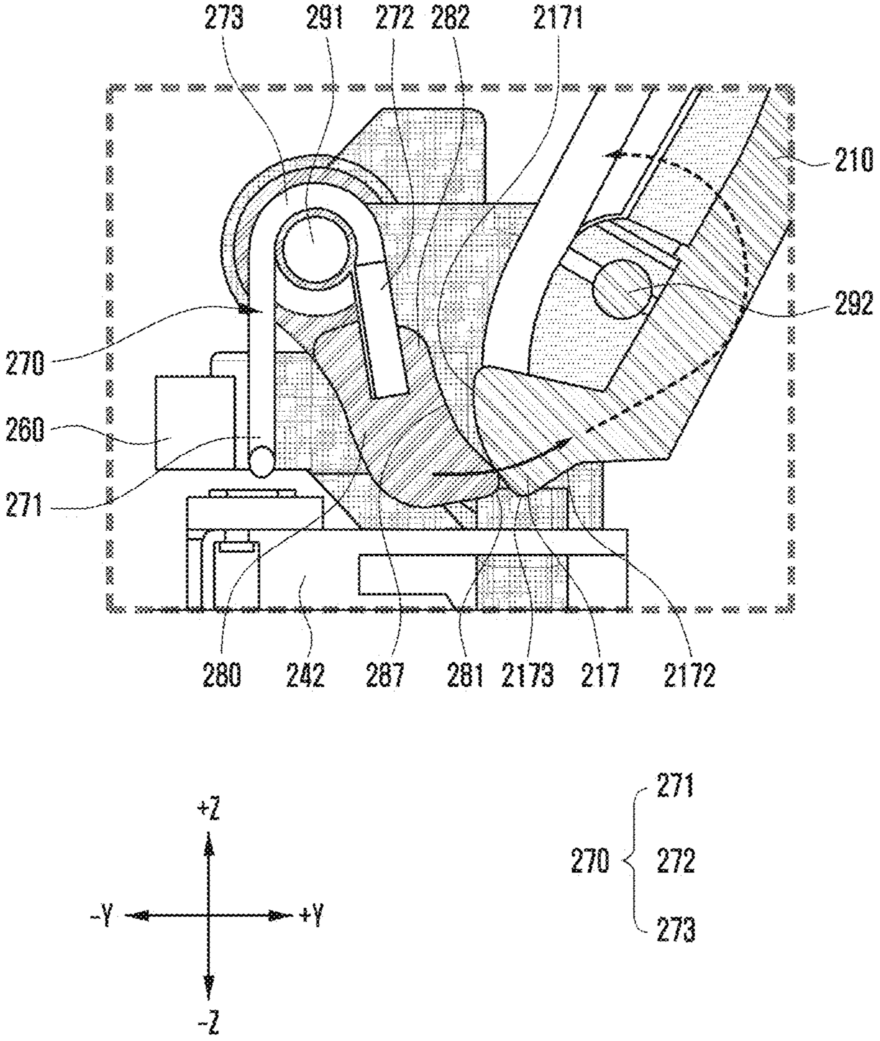
Figure 4C:
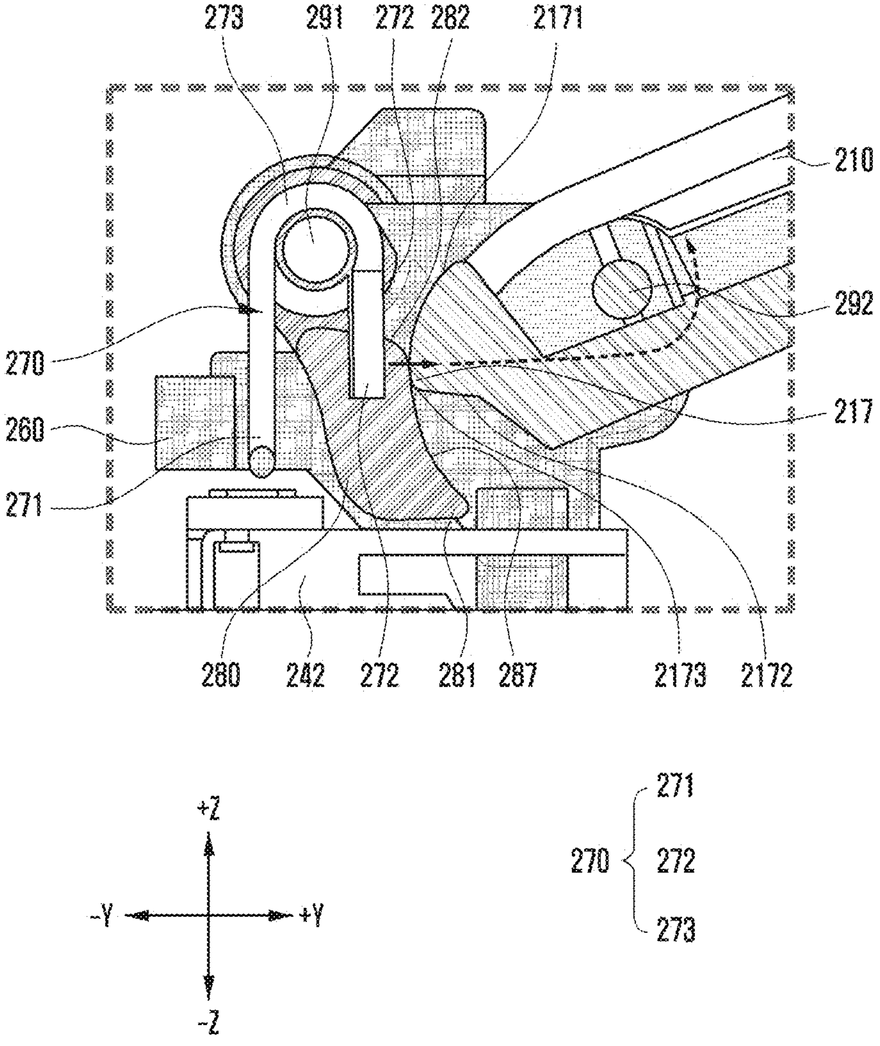

FIGS. 4A, 4B, and 4C are views illustrating the opening/closing structure (A) in a first state of the electronic device 200 according to an embodiment of the disclosure.

Figure 4D:
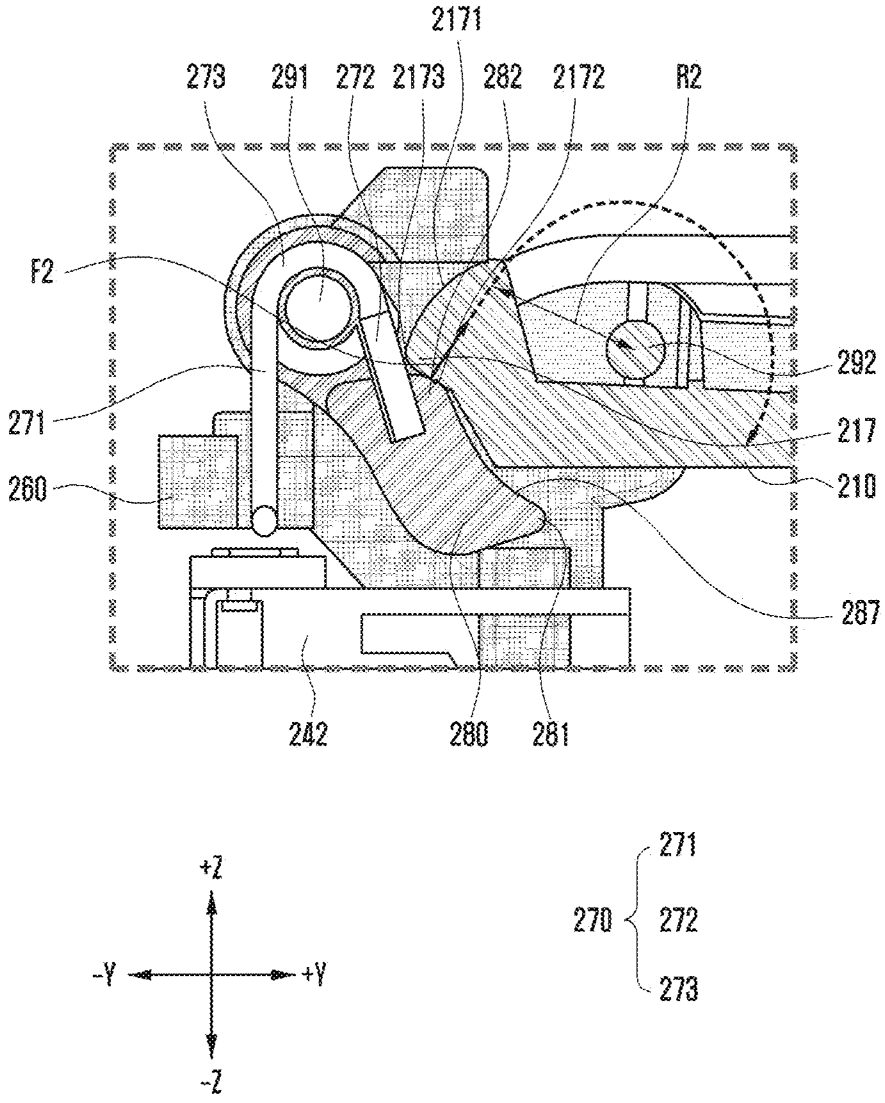

FIG. 4D is a view illustrating the opening/closing structure (A) in a second state of the electronic device 200 according to an embodiment of the disclosure.

Figure 4E:
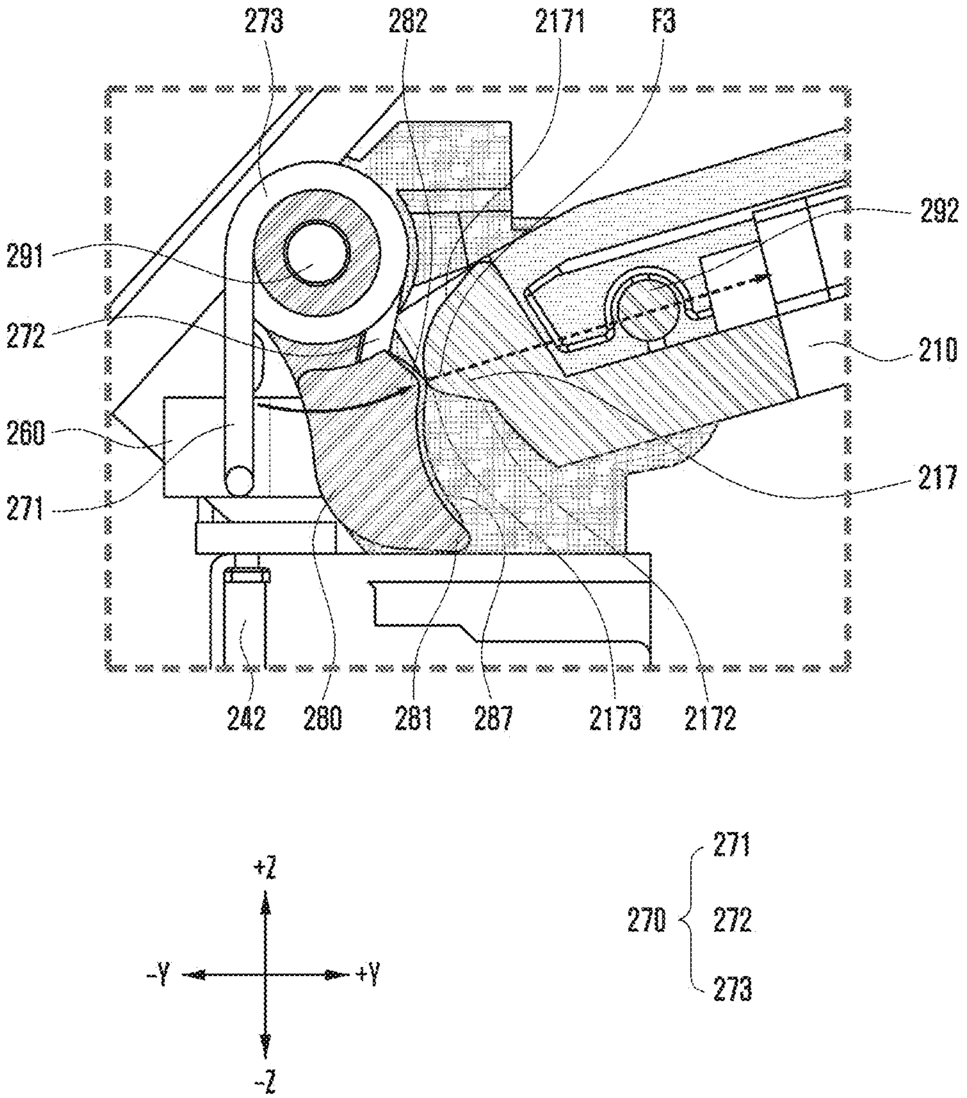

FIG. 4E is a view illustrating the opening/closing structure (A) in a third state of the electronic device 200 according to an embodiment of the disclosure.

FIGS. 4A to 4E are views the opening/closing structure (A) of the electronic device 200 of FIG. 3B, taken on a cross-section plane parallel to the length direction and the height direction of the electronic device 200 (e.g., the y-axis and z-axis directions).

In an embodiment, the first state of the electronic device 200 may refer to the state in which the first body 210 is rotated in the direction toward the second body 220 (see FIG. 3A). In the first state, the first body 210 may be rotated around the second shaft 292 toward the second body 220 (see FIG. 3A).

In an embodiment, the second state of the electronic device 200 may refer to the state in which the first body 210 is rotated in the direction away from the second body 220 (see FIG. 3A). In the second state, the first body 210 may be rotated around the second shaft 292 away from the second body 220 (see FIG. 3A).

In an embodiment, the first state may be the state in which the first body 210 and the hinge member 260 approach each other. The second state may be the state in which the first body 210 and the hinge member 260 are spaced away from each other.

In an embodiment, the opening/closing structure (A) of the electronic device 200 may include at least one contact area 217 of the first body 210, the hinge member 260, the elastic member 270, the guide member 280, and/or the shaft 290.

In an embodiment, the elastic member 270 may include a fixing area 271, a transmission area 272, and/or an elastic connection area 273.

In an embodiment, the fixing area 271 of the elastic member 270 may be disposed on the hinge member 260 and serve to fix the position of the elastic member 270. The fixing area 271 may extend in the height direction of the electronic device 200 (e.g., the z-axis direction) to be fixed to at least a portion of the hinge member 260.

In an embodiment, the transmission area 272 of the elastic member 270 may be an area that transmits the elastic force generated by the elastic member 270 to the guide member 280. At least a portion of the transmission area 272 may be disposed on the guide member 280.

In an embodiment, the elastic connection area 273 of the elastic member 270 may be an area that interconnects the fixing area 271 and the transmission area 272. The elastic connection area 273 may be disposed in the form of circularly surrounding the perimeter of the first shaft 291. The elastic connection area 273 may be an area that generates elastic force.

In an embodiment, the hinge member 260 may be disposed in one direction of the installation area 242 (e.g., the +z-axis direction). For example, the hinge member 260 may be disposed on the surface of the installation area 242 oriented in the height direction of the electronic device 200 (e.g., the +z-axis direction).

In an embodiment, the elastic member 270, the guide member 280, and the at least one contact area 217 of the first body 210 may be disposed on at least a portion of the hinge member 260.

In an embodiment, the shaft 290 may include a first shaft 291 and/or a second shaft 292. The first shaft 291 may interconnect the hinge member 260, the elastic member 270, and the guide member 280. The second shaft 292 may interconnect the first body 210 and the hinge member 260.

In an embodiment, the guide member 280 may include a first area 281, a second area 282, and a concave area 287. The guide member 280 may be in contact with the at least one contact area 217 of the first body 210 in the first area 281, the second area 282, or the concave area 287.

In an embodiment, the first area 281 and the second area 282 may protrude from one surface of the guide member 280.

In an embodiment, the concave area 287 may be disposed between the first area 281 and the first area 282. The concave area 287 may have a concave shape on one surface of the guide member 280.

In an embodiment, the at least one contact area 217 of the first body 210 may be provided at one end of the first body 210. The first body 210 may be in contact with the guide member 280 in the at least one contact area 217.

In an embodiment, the at least one contact area 217 of the first body 210 may include a first contact area 2171, a second contact area 2172, and/or a third contact area 2173. The third contact area 2173 may refer to an area protruding from one surface of the at least one contact area 217.

In an embodiment, the first contact area 2171 may be disposed on one side of the at least one contact area 217, and the second contact area 2172 may be disposed on the other side of the at least one contact area 217. For example, the first contact area 2171 may be an area located on one side of the third contact area 2173, and the second contact area 2172 may be an area located on the other side of the third contact area 2173.

In an embodiment, the first contact area 2171 may have a convex shape on one side of the at least one contact area 217.

In an embodiment, the direction in which the first body 210 is rotated may vary depending on the position where the at least one contact area 217 of the first body 210 and the guide member 280 are in contact with each other.

In an embodiment, the first state may refer to the state in which the first body 210 is rotated in the direction toward the second body 220 (see FIG. 3A). Referring to FIGS. 4A to 4C, the first state may refer to the state in which the first body 210 rotates counterclockwise (e.g., in the direction from the +y-axis toward the +z-axis) around the second shaft 292. In the first state, the first body 210 may be rotated toward the second body 220, and the accommodation space in the electronic device 200 may be closed.

Referring to FIGS. 4A to 4C, in the first state, the first contact area 2171 of the first body 210 may be in contact with the first area 281 and the second area 282 or the concave area 287 of the guide member 280.

Referring to FIGS. 4A to 4C, in the first state, the at least one contact area 217 of the first body 210 may be in contact with the guide member 280 along the concave area 287. For example, in the first state, the point where the at least one contact area 217 of the first body 210 is in contact with the guide member 217 may be moved along the concave area 287.

Referring to FIG. 4A, in the first state, the guide member 280 may transmit first state force F1 toward the at least one contact area 217 of the first body 210. In the first state, the first state force F1 may have a distance equal to a first separation distance R1 from the second shaft 292 in a direction perpendicular to the direction in which the first state force F1 acts. Since the direction of action of the first state force F1 is located at a distance from the second shaft 292, rotational moment may be generated in the first body 210 around the second shaft 292. The first body 210, which receives the rotational moment due to the first state force F1, may rotate around the second shaft 292 counterclockwise (e.g., from the +y-axis toward the +z-axis).

In an embodiment, the first body 210 illustrated in FIG. 4A may be located closer to the second body 220 (see FIG. 3A) and the hinge member 260 compared to the first body 210 illustrated in FIGS. 4B and 4C. For example, the electronic device 200 may be closer to the closed state in the order of FIG. 4A, FIG. 4B, and FIG. 4C.

In an embodiment, as the electronic device 200 approaches the closed state, the rotational moment transmitted to the first body 210 may increase. For example, in the state illustrated in FIG. 4A, the first body 210 may receive greater rotational moment because the first separation distance R1 is formed to be greater than in the state illustrated in FIGS. 4B and 4C.

In an embodiment, the second state may refer to the state in which the first body 210 is rotated in the direction away from the second body 220 (see FIG. 3A). Referring to FIG. 4D, the second state may refer to the state in which the first body 210 rotates clockwise (e.g., in the direction from the +y-axis toward the +z-axis) around the second shaft 292. In the second state, the first body 210 may be rotated away from the second body 220 (see FIG. 3A), and the accommodation space in the electronic device 200 may be opened.

Referring to FIG. 4D, in the second state, the second contact area 2172 of the first body 210 may be in contact with the second area 282 of the guide member 280.

Referring to FIG. 4D, in the second state, the guide member 280 may transmit second state force F2 toward the at least one contact area 217 of the first body 210. In the second state, the first state force F2 may have a distance equal to a second separation distance R2 from the second shaft 292 in a direction perpendicular to the direction in which the second state force F2 acts. Since the direction of action of the second state force F2 is located at a distance from the second shaft 292, rotational moment may be generated in the first body 210 around the second shaft 292. The second body 210, which receives the rotational moment due to the second state force F2, may rotate around the second shaft 292 clockwise (e.g., from the z-axis toward the y-axis).

In an embodiment, the third state may refer to the state in which no rotational force acts on the first body 210. The third state may refer to the intermediate state between the first state and the second state. For example, the electronic device 200 may switch from the first state to the second state via the third state, or may switch from the second state to the first state via the third state.

Referring to FIG. 4E, in the third state, the third contact area 2173 of the first body 210 may be in contact with the second area 282 of the guide member 280.

Referring to FIG. 4E, in the third state, the guide member 280 may transmit third state force F3 toward the at least one contact area 217 of the first body 210. The third state force F3 may act in a direction toward the second shaft 292. Since the third state force F3 acts in a direction toward the second shaft 292, no rotational moment may be generated in the first body 210 about the second shaft 292.

In an embodiment, when force is transmitted from the outside of the electronic device 200 in the third state and the relative positions of the at least one contact area 217 of the first body 210 and the guide member 280 change, the electronic device 200 may switch from the third state to the first state or the second state. For example, when the user of the electronic device 200 applies force to the electronic device 200 to switch the electronic device 200 from the third state to the first state or the second state, the first body 210 may be automatically rotated by receiving the rotational moment around the second shaft 292.

In an embodiment, in the state in which the guide member 280 is in contact with the at least one contact area 217 of the first body 210 (e.g., the first state or the second state), frictional resistance may be generated between the guide member 280 and the at least one contact area 217 of the first body 210. Since the at least one contact area 217 of the first body 210 is moved while receiving friction from one surface of the guide member 280, the user of the electronic device 200 may receive a feeling of friction when switching the electronic device 200 to the opened or closed state.

Figure 5:
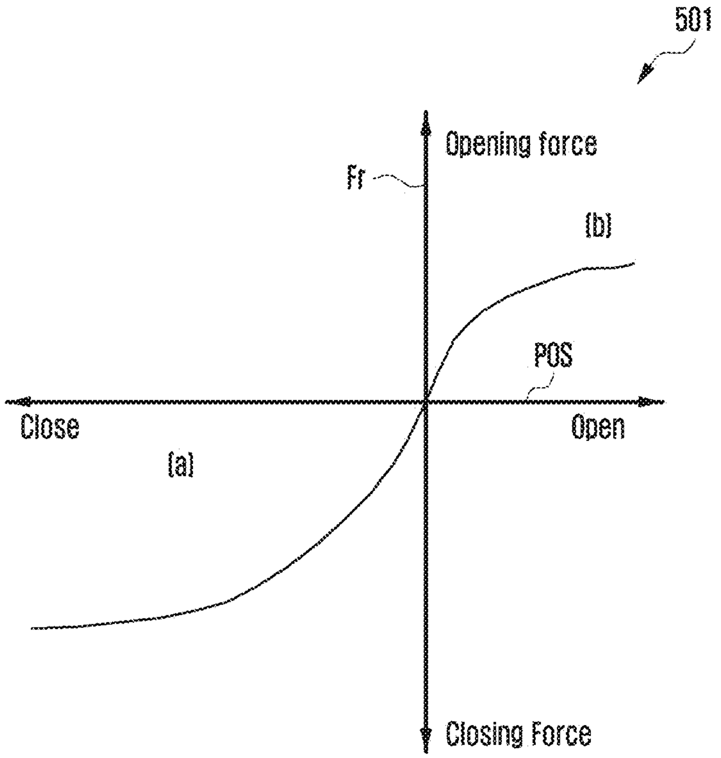
FIG. 5 is a graph showing a change in rotational force depending on the opened/closed state of an electronic device according to an embodiment of the disclosure.

FIG. 5 is a graph 501 showing a change in rotational force depending on the opened/closed states of the electronic device 200 according to an embodiment of the disclosure.

Graph 501 shows a change in rotational force acting on the first body 210 depending on the relative positions of the first body 210 and the guide member 280 illustrated in FIG. 4A.

In an embodiment, the rotational force acting on the first body 210 may refer to the rotational moment acting on the first body 210. For example, the rotational force acting on the first body 210 may have a value obtained by multiplying a force generated by the elastic member 270 (e.g., the first state force F1 (see FIG. 4A)) by the distance of the second shaft 292 from the direction of application of the force (e.g., a first separation distance R1 (see FIG. 4A)).

In Graph 501, the horizontal axis POS may represent the relative positions of the first body 210 and the guide member 280. For example, the closed state (Close) may represent the state in which the first body 210 and the second body 220 become closer to each other and the accommodation space in the electronic device 200 is completely closed. The opened state (Open) may represent the state in which the first body 210 and the second body 220 become farther away from each other so that the accommodation space in the electronic device 200 is opened to the maximum. In Graph 501, as the horizontal axis POS moves toward the closed state (Close), the first body 210 may be rotated in a direction toward the second body 220.

In Graph 501, the vertical axis Fr may indicate the magnitude and direction of the rotational force acting on the first body 210. For example, the opening force on the vertical axis Fr may represent the rotational force acting on the first body 210 to bring the first body 210 away from the second body 220. The closing force may refer to the rotational force acting on the first body 210 to bring the first body 210 closer to the second body 220.

Referring to Graph 501, the magnitude and direction of the rotational force acting on the first body 210 may vary depending on changes in the relative positions of the first body 210 and the guide member 280. For example, in area (a) of Graph 501, closing force may act on the first body 210. Area (a) of Graph 501 may represent the state in which the at least one contact area 217 of the first body 210 is located in the first area 281 and the concave area 287 of the guide member 280. In area (a), as the electronic device 200 becomes closer to the closed state, the closing force acting on the first body 210 may increase.

In area (b) of Graph 501, opening force may act on the first body 210. Area (b) of Graph 501 may represent the state in which the second contact area 2172 of the first body 210 is located in the second area 282 of the guide member 280. In area (b), as the electronic device 200 becomes closer to the opened state, the opening force acting on the first body 210 may increase.

In an embodiment, the amount of change in the closing force and opening force acting on the first body 210 may vary depending on the relative position of the first body 210. For example, as the first body 210 becomes closer to the closed state, the increase in closing force may decrease. Likewise, as the first body 210 becomes closer to the opened state, the amount of increase in opening force may decrease.

In an embodiment, the slope of Graph 501 may be changed by the first area 281, the second area 282, and the concave area 287 of the guide member 280. The slope of Graph 501 may refer to the amount of change in the rotational force acting on the first body 210. For example, since the guide member 280 includes the first area 281 and the second area 282 protruding from one surface and the concave area 287 recessed between the first area 281 and the second area 282, the amount of change in rotational force acting on the first body 210 in contact with the guide member 280 may decrease as the guide member becomes closer to the opened state or the closed state. Since the amount of change in the rotational force acting on the first body 210 decreases as the guide member becomes closer to the opened state or the closed state, the first body 210 can be prevented from being opened or closed suddenly.

Figure 6:
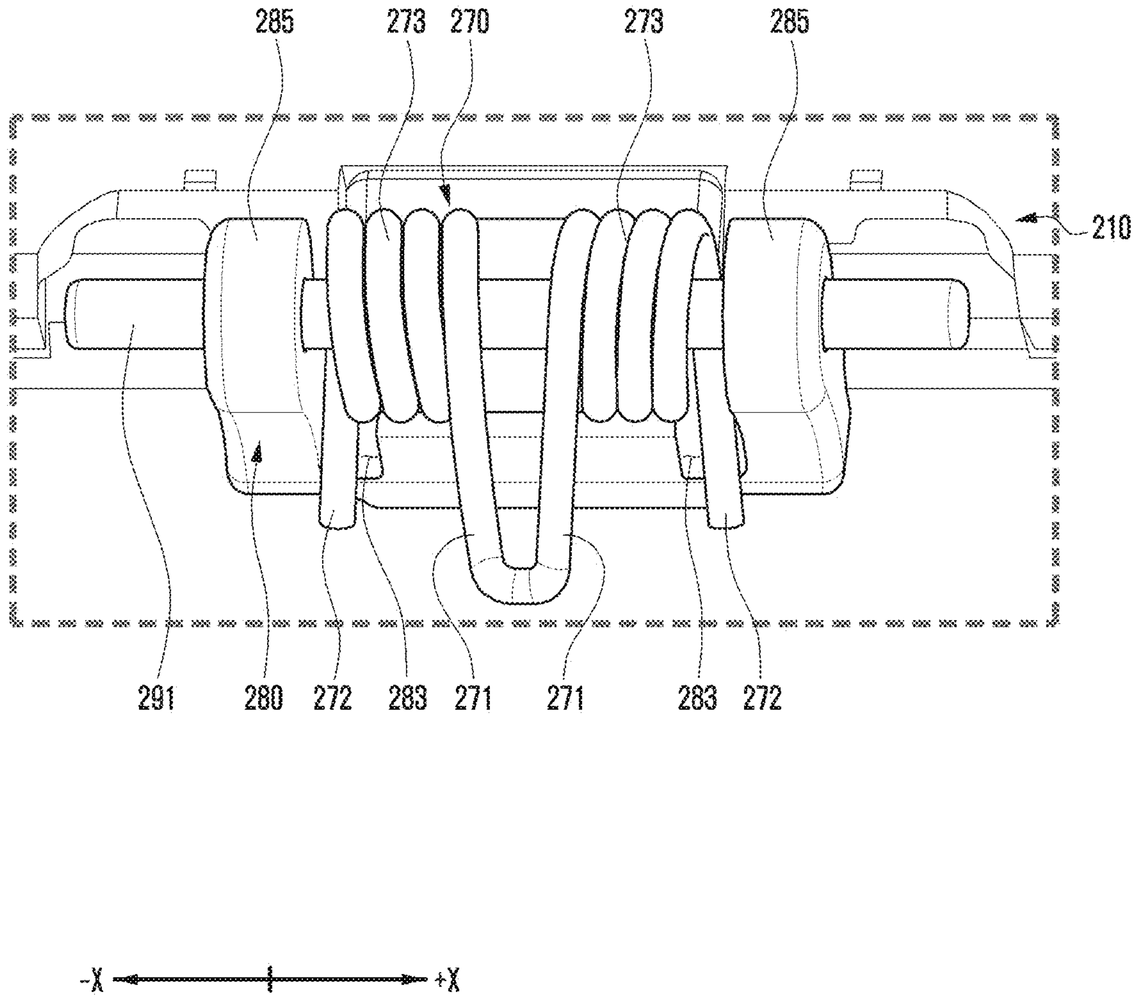
FIG. 6 is a view illustrating an elastic transmission space of a guide member according to an embodiment of the disclosure.

FIG. 6 is a view illustrating an elastic transmission space 283 of the guide member 280 according to an embodiment of the disclosure.

In an embodiment, the width direction of the guide member 280 may refer to the x-axis direction.

In an embodiment, the guide member 280 may include an elastic transmission space 283 in at least a portion thereof. The elastic transmission space 283 may be the space in which a portion of the guide member 280 is concavely recessed compared to other areas.

In an embodiment, the guide member 280 may include two elastic transmission spaces 283. For example, two elastic transmission spaces 283 may be provided at symmetrical positions with respect to the center in the width direction of the guide member 280.

In an embodiment, the elastic member 270 may include a fixing area 271, a transmission area 272, and an elastic connection area 273.

In an embodiment, the transmission area 272 of the elastic member 270 may be located at each of one end and the other end of the elastic member 270. The one end and the other end of the elastic member 270 may refer to the distal ends of the elastic member 270 in the width direction (e.g., the x-axis direction) of the guide member 280.

In an embodiment, the two transmission areas 272 included in the elastic member 270 may be disposed, respectively, in the elastic transmission spaces 283 of the guide member 280.

In an embodiment, the guide member 280 may include a shaft connection area 285. The shaft connection area 285 of the guide member 280 may be provided at each of one end and the other end of the guide member 280 in the width direction (e.g., the x-axis direction).

In an embodiment, the first shaft 291 may extend through at least a portion of the guide member 280. For example, the first shaft 291 may extend along the width direction of the guide member 280 (e.g., in the x-axis direction) through at least a portion of the shaft connection area 285 of the guide member 280.

In an embodiment, the first shaft 291 may extend through the elastic connection area 273 of the elastic member 270. For example, the elastic connection area 273 of the elastic member 270 may be disposed to surround at least a portion of the first shaft 291.

In an embodiment, the connection area 273 of the elastic member 270 may circularly surround the first shaft 291 and extend along the width direction of the guide member 280 (e.g., the x-axis direction). The elastic connection area 273 may be connected to the fixing area 271 at one end and to the transmission area 272 at the other end.

In an embodiment, at least a portion of the fixing area 271 of the elastic member 270 may be disposed in the center of the elastic member 270 in the width direction of the guide member 280 (e.g., the x-axis direction). The elastic member 270 may be fixed to at least a portion of the hinge member 260 (see FIG. 4A) in the fixing area 271.

Figure 7A:
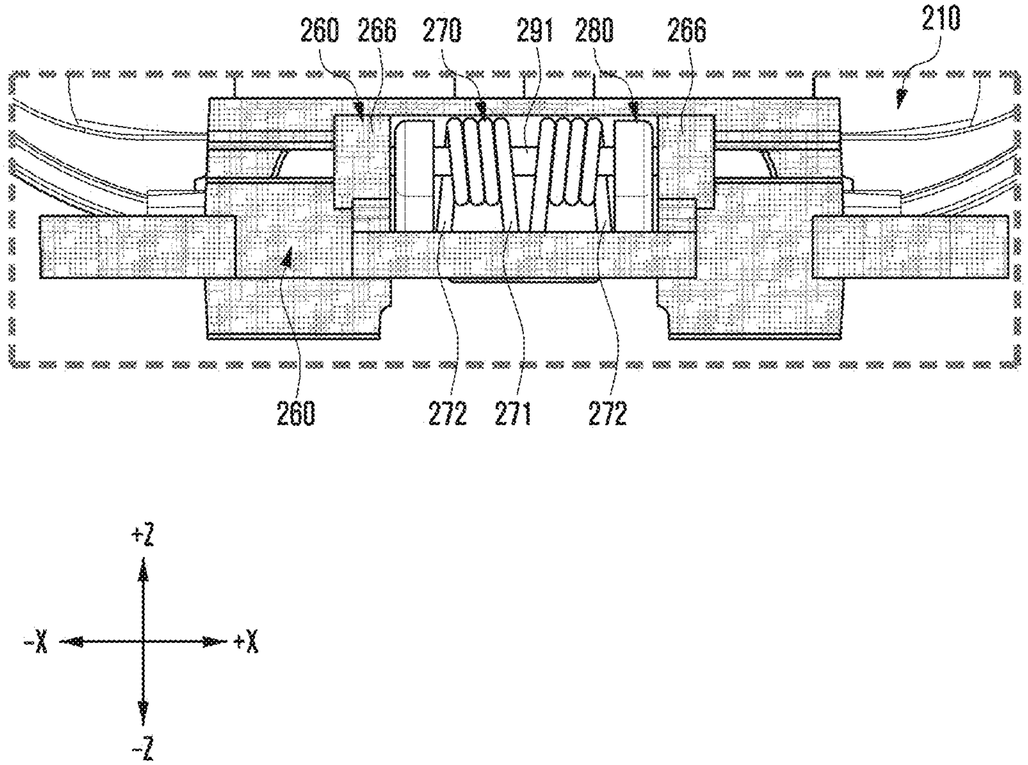
FIGS. 7A and 7B are views illustrating a hinge member and a guide member according to an embodiment of the disclosure.

FIG. 7A is a view illustrating a hinge member 260 and a guide member 280 according to an embodiment of the disclosure.

Figure 7B:
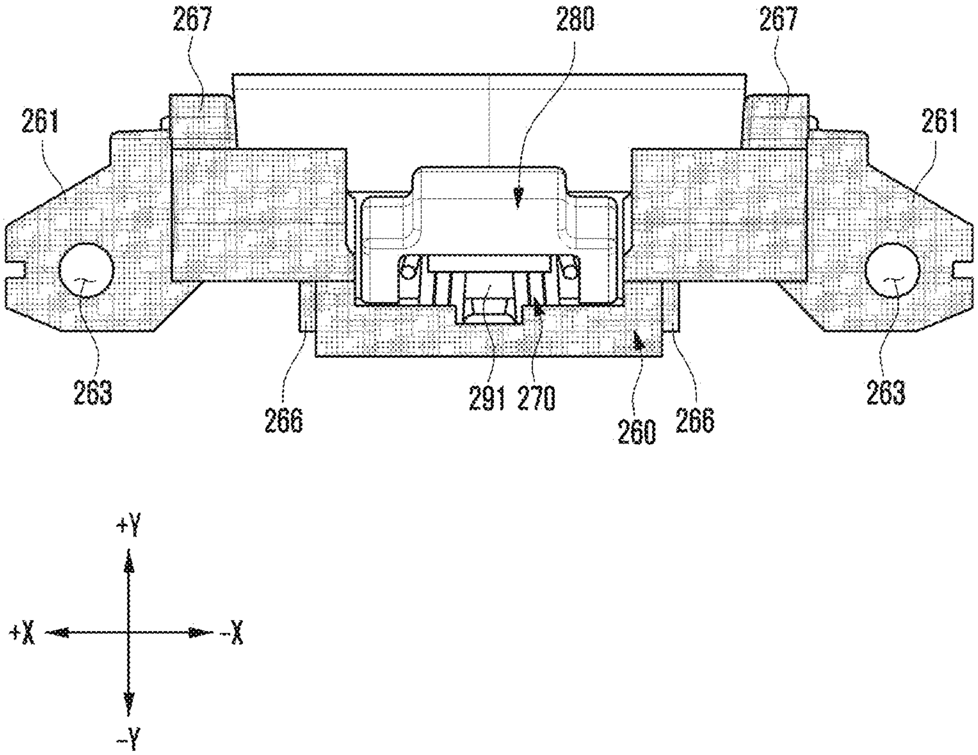

FIG. 7B is a view illustrating the hinge member 260 and the guide member 280 according to an embodiment of the disclosure in a different direction from FIG. 7A.

Referring to FIGS. 7A and 7B, an elastic member 270 and the guide member 280 may be in at least a portion of the hinge member 260.

In an embodiment, the hinge member 260 may be extend in the length direction and the width direction of the electronic device 200 (e.g., the y-axis direction and the x-axis direction).

In an embodiment, the hinge member 260 may include a first shaft coupling area 266 and a second shaft coupling area 267.

Referring to FIG. 7A, two first shaft coupling areas 266 may be provided. The two first shaft coupling areas 266 may be located to be spaced apart from each other in the width direction of the electronic device 200 (e.g., the x-axis direction).

Referring to FIG. 7B, the second shaft coupling area 267 may be located at a position displaced from the first shaft coupling area 266 in the length direction of the electronic device 200 (e.g., the y-axis direction).

In an embodiment, a first shaft 291 may be coupled to the first shaft coupling areas 266 of the hinge member 260. A first shaft 292 may be coupled to the first shaft coupling areas 267 of the hinge member 260.

Referring to FIGS. 7A and 7B, the elastic member 270 and the guide member 280 may be connected to the hinge member 260. For example, the elastic member 270 and the guide member 280 may be connected to the hinge member 260 via the first shaft 291. The first shaft 291 may be connected to the first shaft coupling areas 266 at one end and the other end and may extend in the width direction of the electronic device 200 (e.g., the x-axis direction).

In an embodiment, the hinge member 260 may include a connection area 261. The connection area 261 may be provided at each of the one end (e.g., the distal end of the hinge member 260 located in the +x-axis direction) and the other end of the hinge member 260. The connection areas 261 may be the areas where the hinge member 260 is connected to other areas of the electronic device 200 disposed on the second body 220 (see FIG. 3B).

In an embodiment, a coupling opening 263 may be provided in at least a portion of each of the connection areas 261 of the hinge member 260. The hinge member 260 may be coupled to another area of the electronic device 200 disposed on the second body 220 (see FIG. 3B) via separate coupling members (not illustrated) at the coupling openings 263.

Figure 8A:
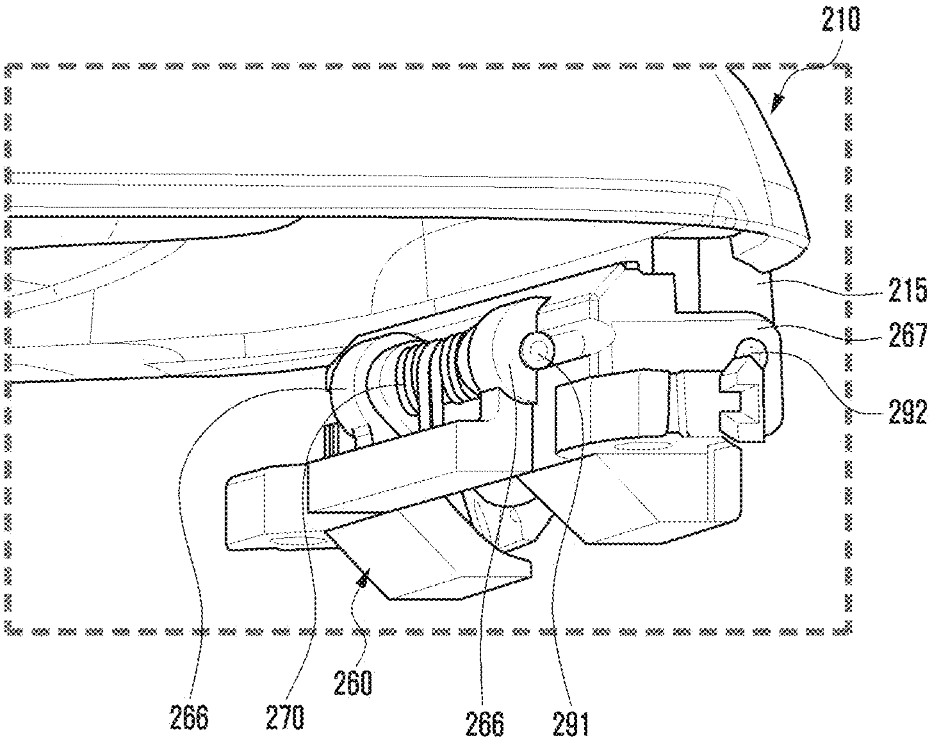
FIGS. 8A and 8B are views illustrating a first member and a guide member according to an embodiment of the disclosure.

FIG. 8A is a view showing a first body 210 and a hinge member 260 according to an embodiment of the disclosure.

Figure 8B:
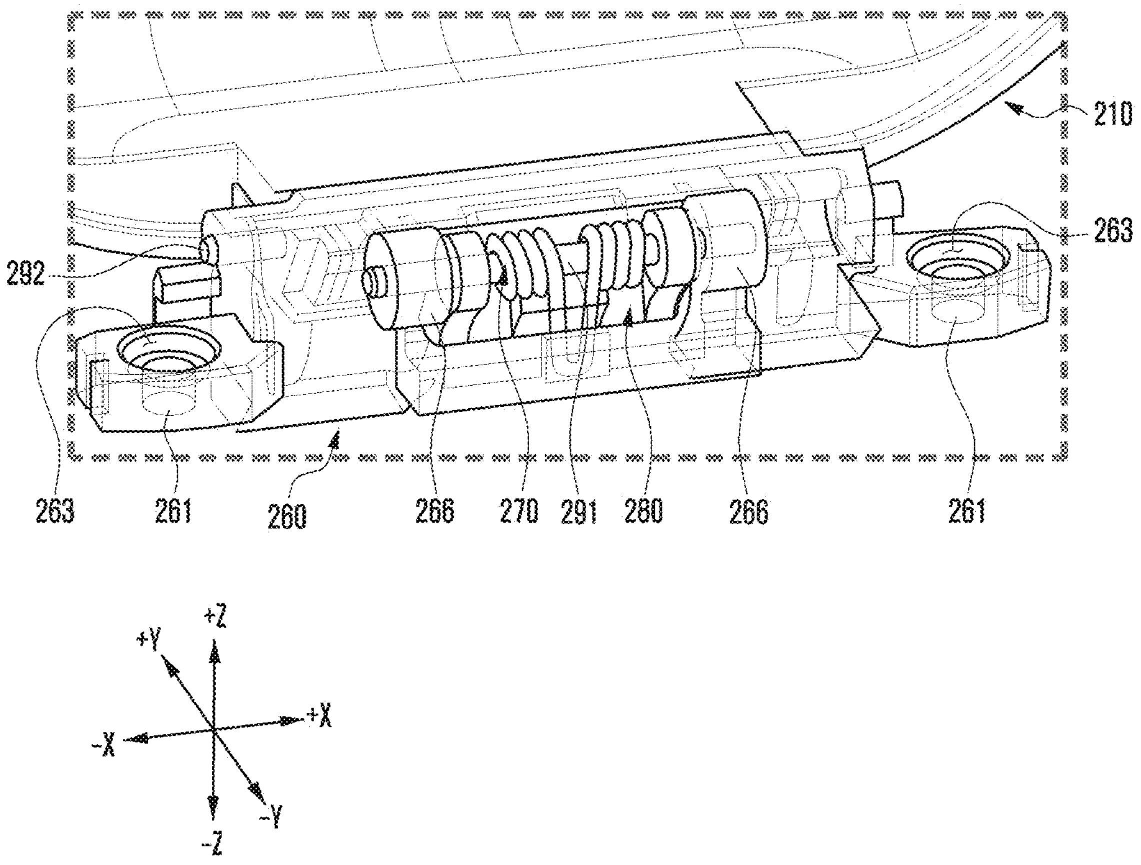

FIG. 8B is a view illustrating the first body 210 and the hinge member 260 according to an embodiment of the disclosure in a different direction from FIG. 8A.

FIG. 8A illustrates the first body 210 and the hinge member 260 in the closed state of an electronic device 200.

FIG. 8B illustrates the first body 210 and the hinge member 260 in the opened state of the electronic device 200.

In an embodiment, the first body 210 may include a hinge connection area 215. The hinge connection area 215 may be an area extending from at least a portion of the first body 210 toward the hinge member 260. The hinge connection area 215 may include, in at least a portion thereof, a hinge structure that is connectable to the hinge member 260.

In an embodiment, the first body 210 may be connected to the hinge member 260 in at least a portion thereof. For example, the hinge connection area 215 of the first body 210 and the hinge member 260 may be coupled using a second shaft 292.

In an embodiment, the first body 210 may be rotatably connected to the hinge member 260. For example, the first body 210 may be connected to the hinge member 260 to be rotatable about the hinge connection area 215 of the first body 210.

In an embodiment, a first shaft 291 and the second shaft 292 may extend in the width direction of the electronic device 200 (e.g., the x-axis direction). The first shaft 291 and the second shaft 292 extend in the width direction of the electronic device 200 and may have a rod shape with a circular cross section.

In an embodiment, the first shaft 291 may be coupled to a first shaft coupling areas 266 of the hinge member 260. An elastic member 270 and a guide member 280 may be disposed between two first shaft coupling areas 266.

In an embodiment, the second shaft 292 may be coupled to a second shaft coupling areas 267 of the hinge member 260. In the hinge member 260, the second shaft 292 may be coupled to the second shaft coupling areas 267, and the hinge member 260 and the hinge coupling area 215 of the first body 210 may be connected to each other.

In an embodiment, before the electronic device 200 is completely assembled, the defective state of the hinge structure included in the hinge connection area 215 of the already manufactured first body 210 may be checked. When it is determined that there is no defect in the hinge structure included in the hinge connection area 215, the first body 210 may be coupled to the hinge member 260 via the second shaft 292 in the hinge connection area 215.

Figure 9:
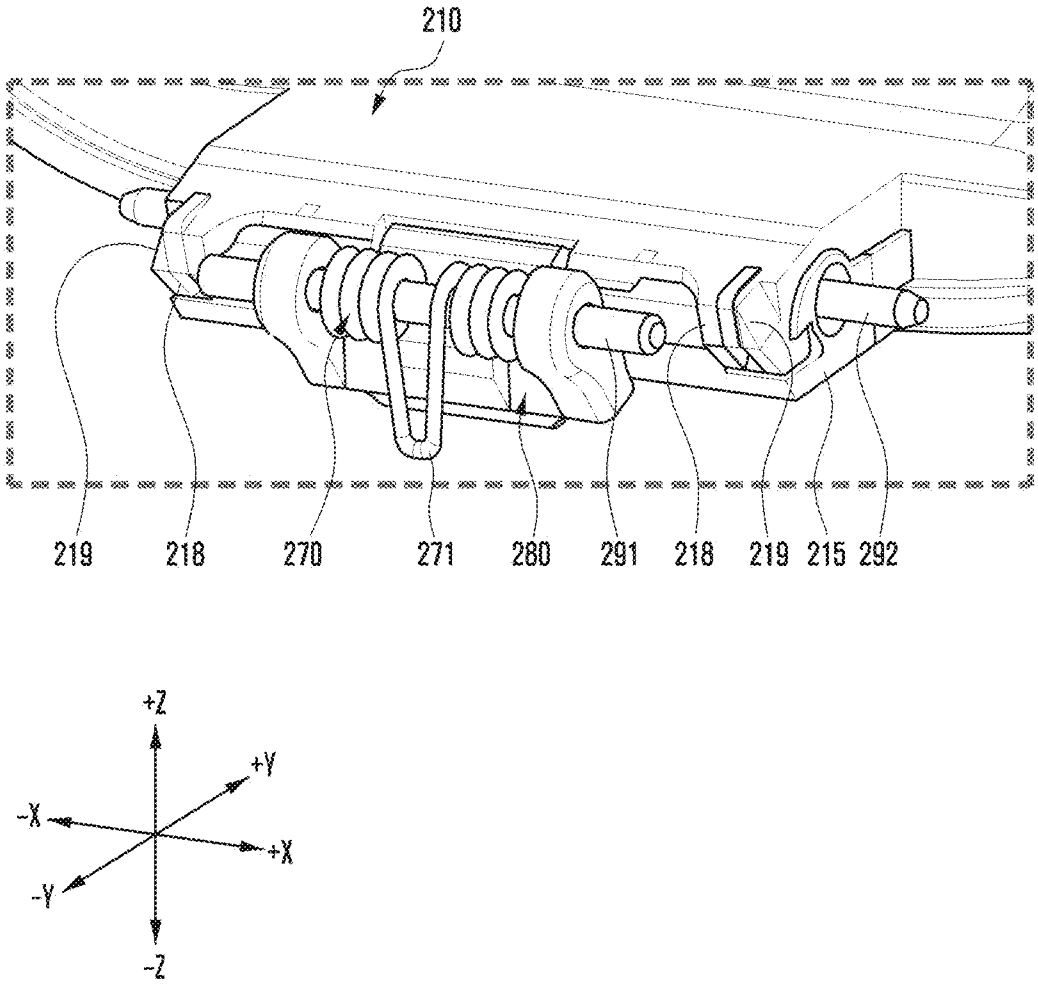
FIG. 9 is a view illustrating a first body and a guide member according to an embodiment of the disclosure.

FIG. 9 is a view illustrating the first body 210 and the guide member 280 according to an embodiment of the disclosure.

In an embodiment, the width direction of the first body 210 may refer to the x-axis direction, and the height direction of the first body 210 may refer to the z-axis direction.

In an embodiment, the first body 210 may include an anti-rotation area 218 and a first anti-rotation surface 219.

In an embodiment, the anti-rotation area 218 may be provided at one end of the first body 210. Two anti-rotation areas 218 may be provided at one end of the first body 210 (e.g., the one end of the first body 210 that is in contact with the guide member 280).

In an embodiment, the first anti-rotation surface 219 may be provided on one side and the other side of the first body 210. One side of the first body 210 may refer to the side surface of the first body 210 located in the +x-axis direction, and the other side of the first body 210 may refers to the side surface of the first body 210 located in the −x-axis direction.

In an embodiment, the anti-rotation area 218 serves to prevent the first body 210 from rotating more than a predetermined angle with respect to the second body 220 in the second state of the electronic device 200.

In an embodiment, the first anti-rotation surface 219 may be provided on one surface of each of the two anti-rotation areas 218. Each of two first anti-rotation surfaces 219 may have an inclined shape based on the height direction of the first body 210 (e.g., the z-axis direction). For example, each of the first anti-rotation surfaces 219 may be a surface be inclined with respect to a direction parallel to the height direction of the first body 210 (e.g., the z-axis direction). Each of the two first anti-rotation surfaces 219 may be oriented perpendicularly to the direction rotated toward the width direction of the first body 210 (e.g., the +x-axis direction or the −x-axis direction) from the height direction of the first body 210 (e.g., the z-axis direction) by a predetermined angle.

In an embodiment, the first anti-rotation surfaces 219 may be inclined in the width direction toward the inside of the first body 210 from the height direction of the first body 210 (e.g., the +z-axis direction) in at least a portion of a surface perpendicular to the width direction of the first body 210 (e.g., the x-axis direction). For example, when the first anti-rotation surface 219 is a surface provided on one side of the first body 210, the width direction toward the inside of the first body 210 may refer to the width direction from the first anti-rotation surface 219 located on the one side of the first body 210 toward the other side of the first body 210.

In an embodiment, the second shaft 292 may be coupled to the hinge connection area 215 of the first body 210.

In an embodiment, the guide member 280 may be at least partially in contact with the first body 210. The first body 210 may be disposed in the length direction of the electronic device 200 (e.g., the +y-axis direction) with respect to the guide member 280.

In an embodiment, the elastic member 270 may transmit force to the guide member 280, and the guide member 280, which receives the force from the elastic member 270, may transmit the force to the first body 210 located in the length direction of the electronic device 200 (e.g., the +y-axis direction) with respect to the guide member 280.

Figure 10:
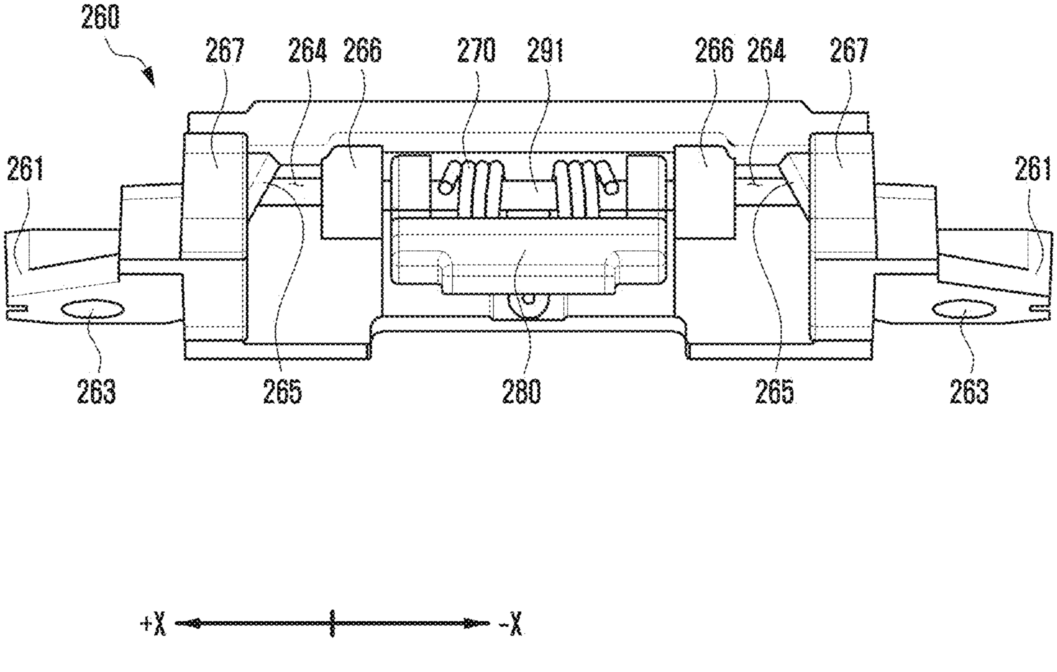
FIG. 10 is a view illustrating a hinge member according to an embodiment of the disclosure.

FIG. 10 is a view illustrating a hinge member 260 according to an embodiment of the disclosure.

In an embodiment, the hinge member 260 may extend along the width direction of an electronic device 200 (e.g., x-axis direction).

In an embodiment, the hinge member 260 may include an inner space 264. The inner space 264 may be a space which is provided inside the hinge member 260 and in which at least a portion of the first body 210 is disposed.

In an embodiment, the hinge member 260 may include a second anti-rotation surface 265 in at least a portion thereof. The hinge member 260 may include two second anti-rotation surfaces 265.

In an embodiment, the second anti-rotation surfaces 265 may be provided on one side and the other side of the inner space 264 of the hinge member 260, respectively.

In an embodiment, the hinge member 260 may include two first shaft coupling areas 266. An elastic member 270 and a guide member 280 may be disposed between two first shaft coupling areas 266. The first shaft 291 may be coupled to the first shaft coupling areas 266. The first shaft 291 may extend from one first shaft coupling area 266 to the remaining first shaft coupling area 266, and may be coupled to the elastic member 270 and the guide member 280.

In an embodiment, the hinge member 260 may include two second shaft coupling areas 267. The two second shaft coupling areas 267 may be provided at positions symmetrical with respect to the center of the hinge member 260 (e.g., the central point of the hinge member 260 in the x-axis direction).

In an embodiment, the hinge member 260 may include connection areas 261 at one end and the other end thereof. A coupling opening 263 may be provided in at least a portion of each of the connection areas 261 of the hinge member 260. The hinge member 260 may be coupled to another area of the electronic device 200 disposed on the second body 220 (see FIG. 3B) via separate coupling members (not illustrated) at the coupling openings 263.

In an embodiment, when the electronic device 200 is assembled, the elastic member 270 and the guide member 280 are disposed on the hinge member 260 and then the first shaft 291 is connected therethrough in the width direction of the electronic device 200 (e.g., the x-axis direction) so that the hinge member 260, the elastic member 270, and the guide member 280 may be assembled into one configuration.

In an embodiment, when the electronic device 200 is assembled, the first body 210, which has already been assembled, is disposed in one configuration including the hinge member 260, the elastic member 270, and the guide member 280, and then the second shaft 292 (see FIG. 9) may be connected therethrough along the width direction of the electronic device 200 (e.g., the x-axis direction). The position of the guide member 280 in the state in which the second shaft 292 (see FIG. 9) is assembled may be the same as the position of the guide member 280 when the electronic device 200 is in the closed state.

Figure 11:
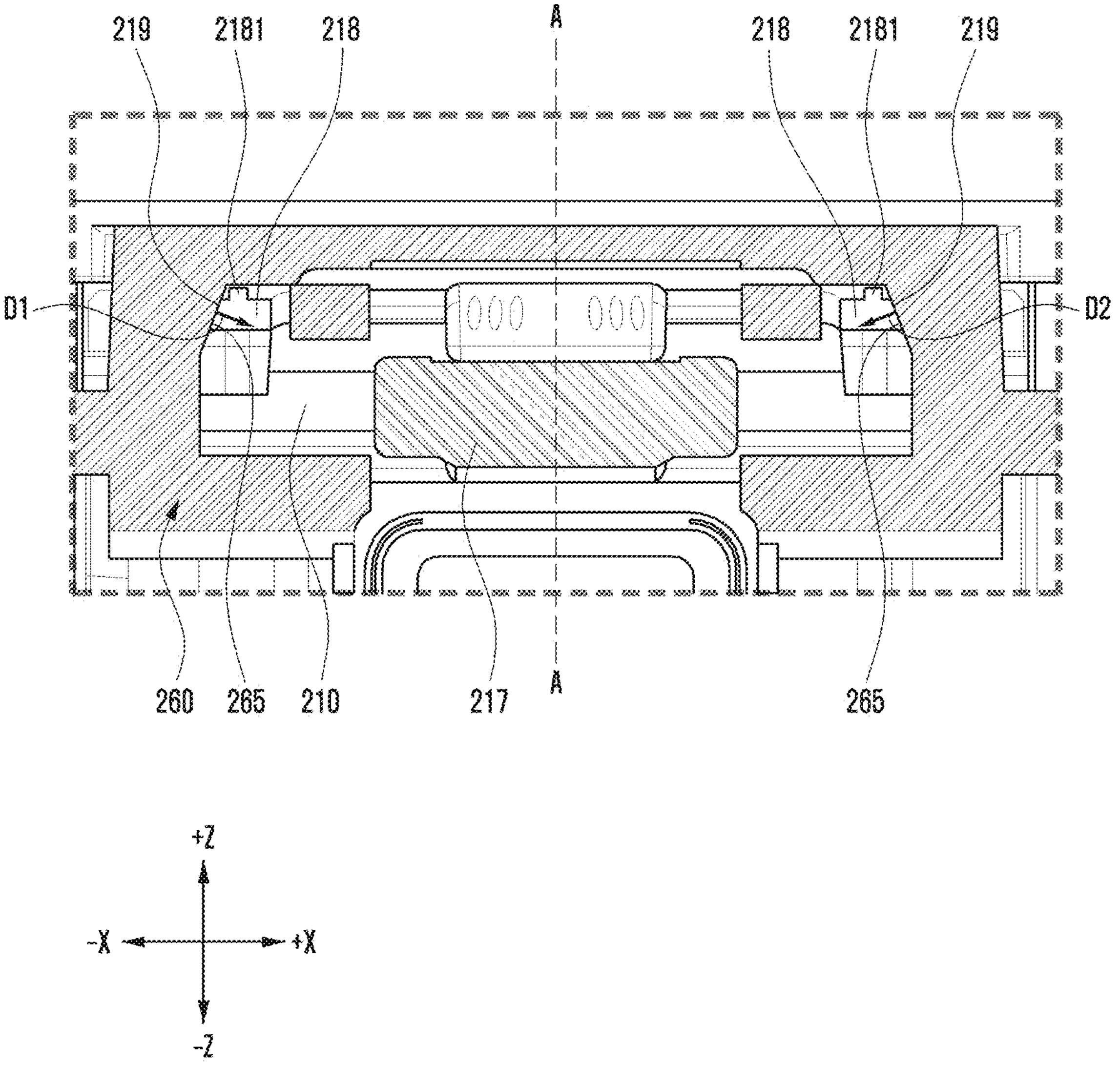
FIG. 11 is a view illustrating first anti-rotation surfaces and second anti-rotation surfaces according to an embodiment of the disclosure.

FIG. 11 is a view illustrating first anti-rotation surfaces 219 and second anti-rotation surfaces 265 according to an embodiment of the disclosure.

FIG. 11 is a view of an arrangement of the first anti-rotation surfaces 219 and the second anti-rotation surfaces 265 in the state in which the accommodation space in the electronic device 200 is completely opened (e.g., in an opened state), taken on a cross-section plane parallel to the width direction and the height direction of the electronic device 200 (e.g., the x-axis direction and the z-axis direction).

In an embodiment, a line extending in the z-axis direction from the central point of the hinge member 260 and the first body 210 in the width direction of the electronic device 200 (e.g., the x-axis direction) may be defined as the widthwise center line A-A of the electronic device 200.

In an embodiment, two second anti-rotation surfaces 265 may be provided at symmetrical positions with respect to the widthwise center line A-A of the electronic device 200. Each of the two second anti-rotation surfaces 265 may have a shape inclined toward the widthwise center line A-A of the electronic device 200.

In an embodiment, the anti-rotation areas 218 of the first body 210 may be provided at positions symmetrical with respect to the widthwise center line A-A of the electronic device 200.

In an embodiment, the first body 210 may include an anti-rotation area 218 and a first anti-rotation surface 219.

In an embodiment, the first body 210 may include first anti-rotation surfaces 219 on one side and the other side of the first body 210, respectively. The first anti-rotation surfaces 219 may be formed at positions symmetrical with respect to the widthwise center line A-A of the electronic device 200. Each of the two first anti-rotation surfaces 219 may have a shape inclined toward the widthwise center line A-A of the electronic device 200.

In an embodiment, when the electronic device 200 is in the opened state (e.g., the state in which the accommodation space in the electronic device 200 is completely opened), the first anti-rotation surfaces 219 of the first body 210 may be at least partially in contact with the second anti-rotation surfaces 265 of the hinge member 260, respectively. For example, at least a portion of the first anti-rotation surface 219 located on one side of the first body 210 and at least a portion of the first anti-rotation surface 219 located on the other side of the first body 210 may be in contact with the corresponding second anti-rotation surfaces 265, respectively.

In an embodiment, a first direction D1 and a second direction D2 may refer to directions in which the two second anti-rotation surfaces 265 included in the hinge member 260 are oriented (e.g., the directions perpendicular to the two second anti-rotation surfaces 265), respectively.

In an embodiment, the first direction D1 may refer to a direction inclined from the +x-axis direction toward the −z-axis. The second direction D2 may refer to a direction inclined from the −x-axis direction toward the −z-axis.

In the opened state of the electronic device 200, the first anti-rotation surfaces 219 of the first body 210 may be oriented in a direction opposite to the first direction D1 or a direction opposite to the second direction D2. For example, one first anti-rotation surface 219 may be oriented in a direction opposite to the first direction D1, and the remaining first anti-rotation surface 219 may be oriented in a direction opposite to the second direction D2.

In an embodiment, each anti-rotation area 218 of the first body 210 may include a protruding area 2181 in at least a portion thereof. The protruding area 2181 may have a shape partially protruding from one surface of the anti-rotation area 218.

Figure 12A:
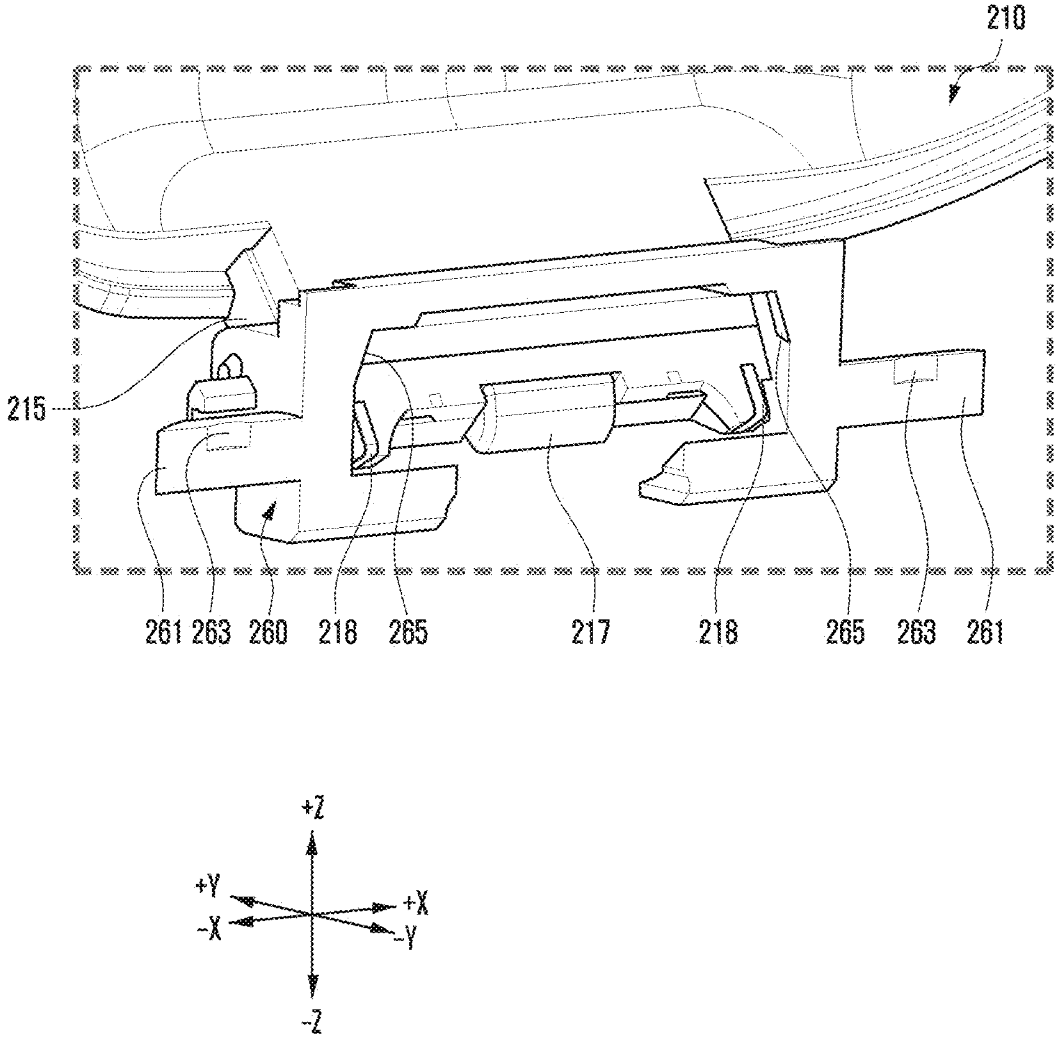
FIGS. 12A to 12C illustrate changes in the relative positions of first anti-rotation surfaces and second anti-rotation surfaces depending on the opened/closed state of the electronic device according to an embodiment of the disclosure.
Figure 12B:
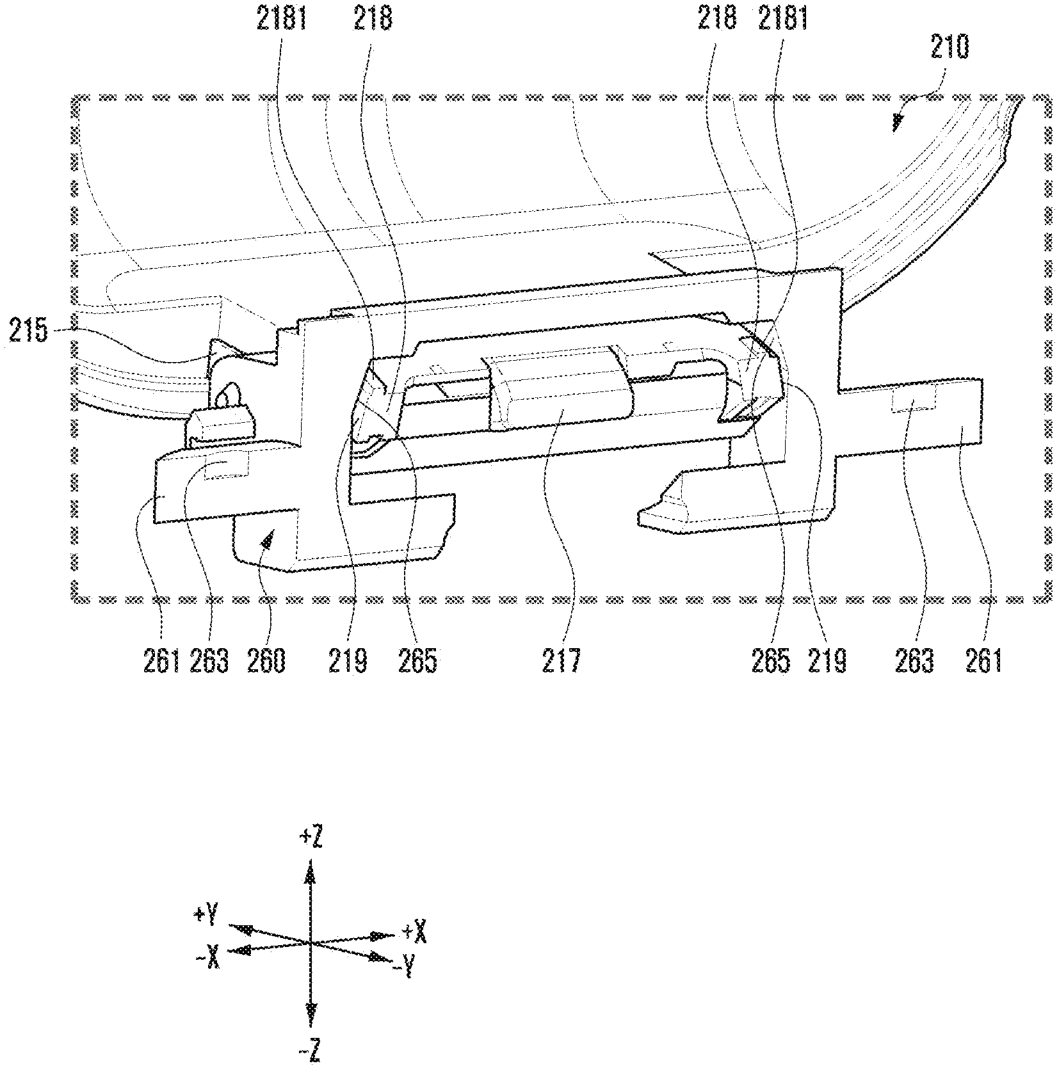
Figure 12C:
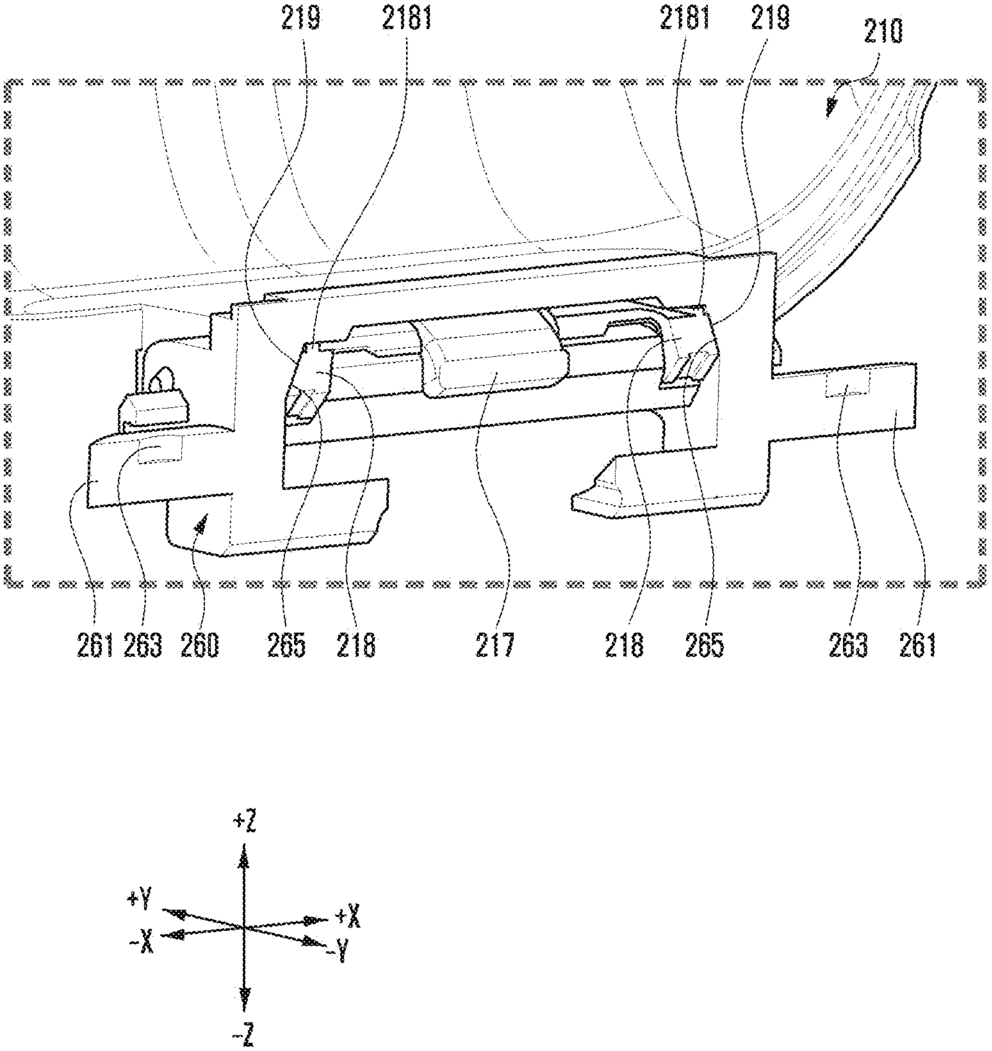

FIGS. 12A to 12C illustrate changes in the relative positions of the first anti-rotation surfaces 219 and the second anti-rotation surfaces 265 depending on the opened/closed state of the electronic device 200 according to an embodiment of the disclosure.

FIG. 12A illustrates the positional relationship between the first anti-rotation surfaces 219 and the second anti-rotation surfaces 265 in the state in which the accommodation space in the electronic device 200 is only partially opened. For example, in the state illustrated in FIG. 12A, the hinge connection area 215 of the first body 210 may be tilted from the height direction (e.g., z-axis direction) of the electronic device 200 toward the length direction (e.g., the y-axis direction) about 40 degrees.

FIG. 12B illustrates the positional relationship between the first anti-rotation surfaces 219 and the second anti-rotation surfaces 265 in the state in which the accommodation space in the electronic device 200 is only partially opened. The state illustrated in FIG. 12B may be the state in which the accommodation space in the electronic device 200 is further opened compared to the state illustrated in FIG. 12A. For example, in the state illustrated in FIG. 12B, the hinge connection area 215 of the first body 210 may be inclined from the height direction (e.g., z-axis direction) of the electronic device 200 toward the length direction (e.g., the y-axis direction) about 80 degrees.

FIG. 12C illustrates the positional relationship between the first anti-rotation surfaces 219 and the second anti-rotation surfaces 265 in the state in which the accommodation space in the electronic device 200 is completely opened (e.g., the opened state).

In an embodiment, the width direction of the hinge member 260 may refer to the x-axis direction, and the height direction of the hinge member 260 may refer to the z-axis direction.

In an embodiment, the second anti-rotation surfaces 265 may be inclined in the width direction toward the inside of the hinge member 260 from the height direction of the hinge member 260 (e.g., the z-axis direction) in at least a portion of a surface perpendicular to the width direction of the hinge member 260 (e.g., the x-axis direction).

In an embodiment, when the accommodation space in the electronic device 200 is only partially opened, the first anti-rotation surfaces 219 of the first body 210 and the second anti-rotation surfaces 265 of the hinge member 260 may be located at a distance from each other without being in contact with each other. For example, referring to FIGS. 12A and 12B, in the state in which the electronic device 200 is only partially opened, the first anti-rotation surfaces 219 may be located at a distance from the second anti-rotation surfaces 265 in the height direction of the electronic device 200 (e.g., the z-axis direction).

In an embodiment, each anti-rotation area 218 of the first body 210 may include a protruding area 2181 in at least a portion thereof. The protruding area 2181 may have a shape partially protruding from one surface of the anti-rotation area 218. When the electronic device 200 is only partially opened, the protruding areas 2181 may be located at a distance from at least a portion of the hinge member 260 in the height direction of the electronic device 200 (e.g., the z-axis) without being in contact with the hinge member 260.

In an embodiment, when the accommodation space in the electronic device 200 is completely opened (e.g., the opened state), the first anti-rotation surfaces 219 may be at least partially in contact with the second anti-rotation surfaces 265.

In an embodiment, in the state in which the electronic device 200 is completely opened, the first body 210 may receive force (e.g., the second state force F2 (see FIG. 4D)) in a direction away from the second body 220 (see FIG. 3B). For example, since the second area 282 (see FIG. 4D) of the guide member 280 (see FIG. 4D) is in contact with the second contact area 2172 (see FIG. 4D) of the first body 210, the first body 2172 (see FIG. 4D) may receive force in a direction away from the second body 220 (see FIG. 3B). In this case, the first anti-rotation surfaces 219 may be in contact with the second anti-rotation surfaces 265 of the hinge member 260 without being spaced apart from each other.

In an embodiment, when the first anti-rotation surfaces 219 are in contact with the second anti-rotation surfaces 265 without being spaced apart from each other, movement may be prevented from occurring in a portion of the electronic device 200. For example, since the first anti-rotation surfaces 219 and the second anti-rotation surfaces 265 are in contact without being spaced apart from each other, the first body 210 may be prevented from relatively moving in the width direction of the electronic device 200 (e.g., the x-axis direction) with respect to the second body 220 (see FIG. 3B).

In an embodiment, in the state in which the electronic device 200 is completely opened, the first body 210 may receive force (e.g., the first state force F1 (see FIG. 4A)) in a direction becoming closer to the second body 220 (see FIG. 3B). When the first body 210 receives force in a direction becoming closer to the second body 220 (see FIG. 3B), the first anti-rotation surfaces 219 of the first body 210 become farther away from the second anti-rotation surfaces 265 of the hinge member 260. Thus, the first body 210 may be rotated toward the closed state without receiving resistance from the second anti-rotation surfaces 265.

In an embodiment, when the accommodation space in the electronic device 200 is completely opened (e.g., the opened state), the protruding areas 2181 of the first body 210 may be at least partially in contact with the hinge member 260.

Figure 13:
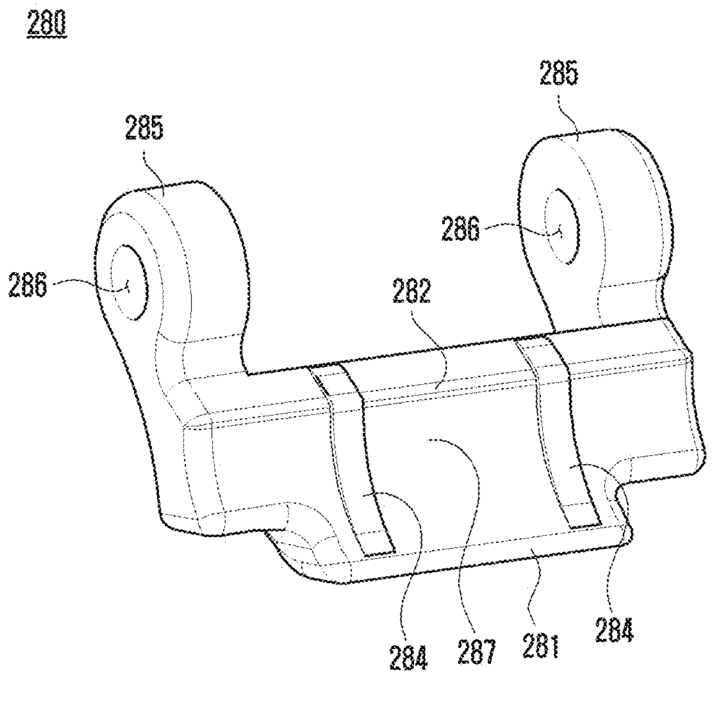
FIG. 13 is a view illustrating a guide member according to an embodiment of the disclosure.

FIG. 13 is a view illustrating a guide member 280 according to an embodiment of the disclosure.

Referring to FIG. 13, the guide member 280 may include a first area 281, a second area 282, shaft connection areas 285, shaft openings 286, a concave area 287, and/or ribs 284.

In an embodiment, the guide member 280 may be in contact with the first body 210 in the first area 281, the second area 282, or the concave area 287.

In an embodiment, one surface of the guide member 280 may include a curved shape. For example, at least a portion of one surface of the guide member 280, which is in contact with the first body 210, may have a concavely curved surface.

In an embodiment, the first area 281 and the second area 282 may each have a shape at least partially protruding from one surface of the guide member 280. The first area 281 and the second area 282 may extend along the width direction of the guide member 280. The width direction of the guide member 280 may refer to a direction from one shaft connection area 285 toward the remaining shaft connection area 285.

In an embodiment, the concave area 287 may be disposed between the first area 281 and the second area 282. The concave area 287 may have a concave shape on one surface of the guide member 280. The concave area 287 may extend along the width direction of the guide member 280.

In an embodiment, the inclination of the surface provided by the guide member 280 in the concave area 287 may not be constant. For example, the inclination of the surface provided by the concave area 287 may vary depending on the position thereof between the first area 281 and the second area 282.

In an embodiment, the guide member 280 may include two shaft connection areas 285. The two shaft connection areas 285 may be disposed to have a distance from each other in the width direction of the guide member 280. Shaft openings 286 may be provided inside the two shaft connection areas 285, respectively.

In an embodiment, a first shaft 291 (see FIG. 8A) may be disposed in the shaft openings 286 and be coupled with the guide member 280. For example, the first shaft 291 (see FIG. 8A) may be disposed to extend through one shaft opening 286 and the remaining shaft opening 286.

In an embodiment, the ribs 284 may be provided on one surface of the guide member 280. The ribs 284 may extend from the first area 281 toward the second area 282.

In an embodiment, the guide member 280 may include two ribs 284. The two ribs 284 may be disposed to have a distance from each other along the width direction of the guide member 280.

In an embodiment, the contact areas 217 of the first body 210 may be in contact with the ribs 284 of the guide member 280. When the guide member 280 includes the ribs 284, the area that is in contact with the at least one contact area 217 of the first body 210 may be reduced to reduce frictional resistance compared to the case where the ribs 284 are not included.

In an embodiment, the guide member 280 may be made of an engineering plastic material. For example, the guide member 280 may be made of a polyoxymethylene (POM) material.

Figure 14:
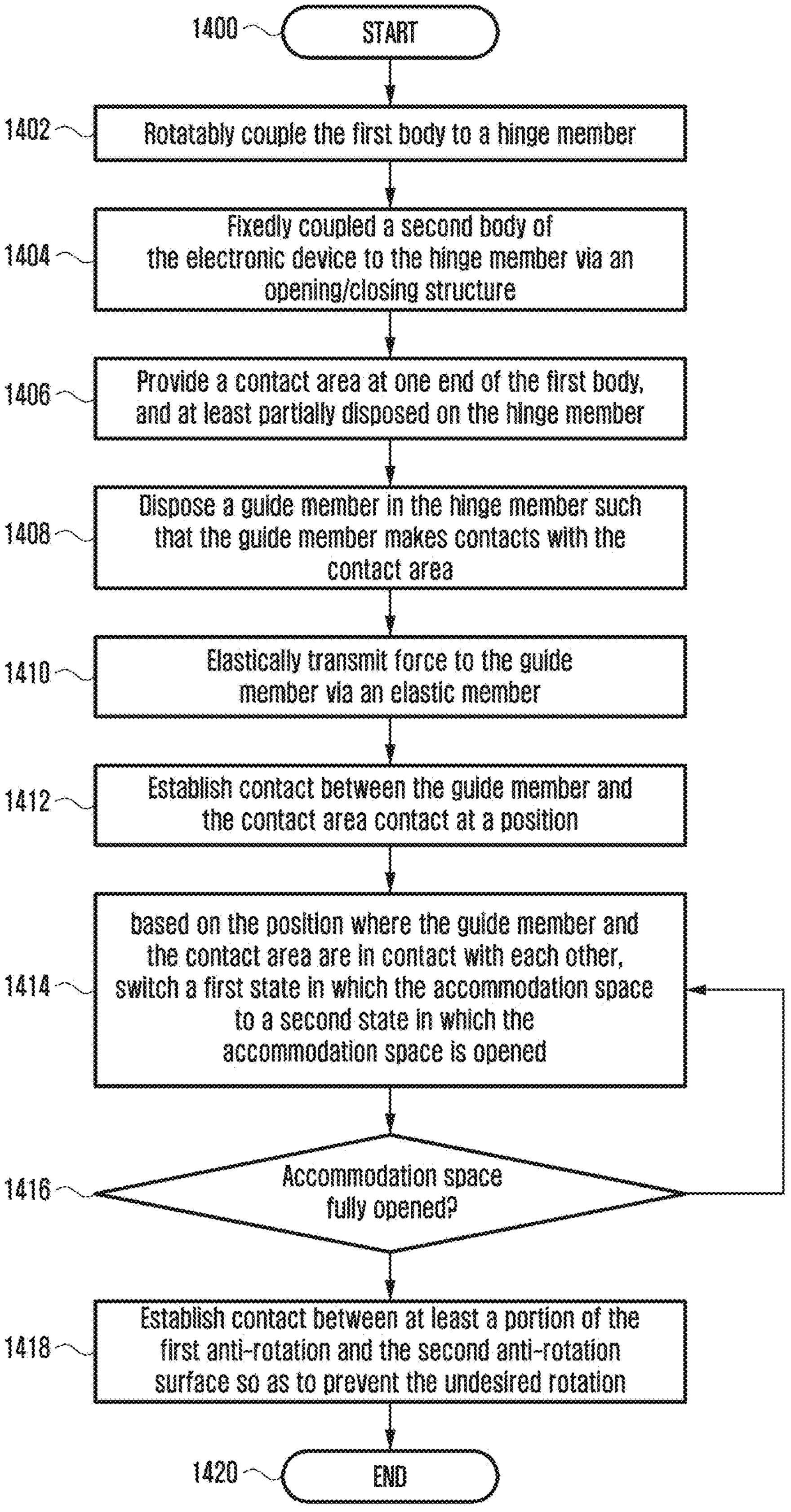
FIG. 14 is a flow diagram illustrating a method of preventing undesired movement of a first body included with an electronic device with respect to a second body of the electronic device.

FIG. 14 is a flow diagram illustrating a method of preventing undesired movement of a first body 210 included with an electronic device 200 with respect to a second body 220 of the electronic device 200. The method begins at operation 1400, and at operation 1402, the first body 210 is rotatably coupled to a hinge member 260. The first body 210 includes a first anti-rotation surface 219 in at least a portion thereof and the hinge member 260 includes a second anti-rotation surface 265 in at least a portion thereof. At operation 1404, a second body 220 of the electronic device 200 is fixedly coupled to the hinge member 260 via an opening/closing structure (A). The second body 220 and the first body 210 define an accommodation space. At operation 1406, a contact area 217 is provided at one end of the first body 210, and is at least partially disposed on the hinge member 260, and a guide member 280 disposed in the hinge member 260 contacts with the contact area 217 at operation 1408. At operation 1410, a force is elastically transmitted to the guide member 280 via an elastic member 270. At operation 1412, the guide member 280 and the contact area 217 contact one another at a position. At operation 1414, based on the position where the guide member 280 and the contact area 217 are in contact with each other, a first state in which the accommodation space is closed is switched to a second state in which the accommodation space is opened. At operation 1416, a determination is made as to whether the accommodation space is fully opened. When the accommodation space is not fully opened, the method returns to operation 1414. When, however, the accommodation space is fully opened, at least a portion of the first anti-rotation surface 219 makes contact with the second anti-rotation surface 265 so as to prevent the undesired movement, and the method ends at operation 1418.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first body comprising a first anti-rotation surface in at least a portion thereof;
an opening/closing structure;
a second body connected to the first body via the opening/closing structure; and
an accommodation space defined by the first body and the second body,
wherein the opening/closing structure comprises:
a hinge member disposed on the second body and comprising a second anti-rotation surface at least a portion thereof, the first body being rotatably connected to the hinge member;
at least one contact area provided at one end of the first body, and at least partially disposed on the hinge member;
a guide member disposed in the hinge member and comprising a first area, a second area, and a concave area between the first area and the second area, the guide member being configured to come into contact with the contact area in the first area, the second area, or the concave area; and
an elastic member configured to elastically transmit force to the guide member,
wherein, depending on a position where the guide member and the contact area are in contact with each other, a first state in which the accommodation space is closed is switched to a second state in which the accommodation space is opened, and
wherein, when the accommodation space is fully opened, at least a portion of the first anti-rotation surface is in contact with the second anti-rotation surface.

2. The electronic device of claim 1, wherein the elastic member is an elastic torsion spring.

3. The electronic device of claim 1, wherein the elastic member comprises a fixing area at least partially fixed to the hinge member.

4. The electronic device of claim 1, wherein the guide member comprises, in at least a portion thereof, an elastic transmission space where at least a portion of the elastic member is seated.

5. The electronic device of claim 1, wherein the at least one contact area of the first body comprises:
a first contact area provided on one side of the at least one contact area;
a second contact area provided on another side of the at least one contact area; and
a third contact area protruding from one surface of the at least one contact area.

6. The electronic device of claim 5, wherein, in the first state, the first contact area of the first body is in contact with the guide member, and
wherein, in the second state, the second contact area of the first body is in contact with the second area of the guide member.

7. The electronic device of claim 6, wherein, in a third state, which is an intermediate state between the first state and the second state, the third contact area of the first body is in contact with the second area of the guide member.

8. The electronic device of claim 1, wherein the guide member further comprises a rib protruding from one surface of the guide member and extending from the first area toward the second area, the rib being in contact with the at least one contact area of the first body.

9. The electronic device of claim 1, wherein the first area of the guide member and the second area of the guide member extend along a width direction of the guide member in a form of protruding from one surface of the guide member.

10. The electronic device of claim 1, wherein the at least one contact area of the first body is in contact with the guide member along the concave area of the guide member in the first state.

11. The electronic device of claim 1, wherein the first body comprises two first anti-rotation surfaces,
wherein one first anti-rotation surface is provided on one side of the first body, and another first anti-rotation surface is provided on another side of the first body,
wherein the hinge member includes two second anti-rotation surfaces, and
wherein one second anti-rotation surface is provided on one side of an inner space provided inside the hinge member, and another second anti-rotation surface is provided on another side of the inner space.

12. The electronic device of claim 11, wherein the first anti-rotation surface is provided such that at least a portion of a surface perpendicular to a width direction of the first body is inclined in the width direction toward an inside of the first body from a height direction of the first body, and
wherein the second anti-rotation surface is provided such that at least a portion of a surface perpendicular to the width direction of the hinge member is inclined in the width direction toward the inside of the hinge member from the height direction of the hinge member, and when the accommodation space is opened to a maximum, at least a portion of the second anti-rotation surface is in contact with the first anti-rotation surface.

13. The electronic device of claim 1, wherein the hinge member comprises coupling openings provided at one end and another end thereof.

14. The electronic device of claim 1, further comprising:

a first shaft interconnecting the hinge member, the guide member, and the elastic member; and a second shaft interconnecting the hinge member and the first body.

15. The electronic device of claim 1, further comprising:

a battery disposed in the second body; and a reception coil disposed on the second body and configured to receive power from an external power transmission device.

16. A method of preventing undesired movement of a first body included with an electronic device with respect to a second body of the electronic device, the method comprising:

rotatably coupling a first body to a hinge member, the first body including a first anti-rotation surface in at least a portion thereof and the hinge member including a second anti-rotation surface in at least a portion thereof;

fixedly coupling a second body to the hinge member via an opening/closing structure, the second body and the first body defining an accommodation space, providing at least one contact area at one end of the first body, and at least partially disposed on the hinge member;

contacting a guide member disposed in the hinge member with the contact area; and elastically transmitting a force to the guide member via an elastic member, wherein, depending on a position where the guide member and the contact area are in contact with each other, switching a first state in which the accommodation space is closed to a second state in which the accommodation space is opened, and wherein, when the accommodation space is fully opened, contacting at least a portion of the first anti-rotation surface with the second anti-rotation surface.

17. The method of claim 16, wherein elastically transmitting the force is performed via an elastic torsion spring.

18. The method of claim 16, wherein elastically transmitting the force includes transmitting the force from an elastic transmission spaced that is formed in at least a portion of the guide and in which the elastic member is seated.

19. The method of claim 18, wherein switching the first state to the second state further comprises:

in the first state, contacting a first contact area of the first body with the guide member, and in the second state, contacting a second contact area of the first body with a contact area of the guide member.

20. The method of claim 19, wherein, the at least one contact area of the first body comprises:

a first contact area provided on one side of the contact area;

a second contact area provided on another side of the contact area; and a third contact area protruding from one surface of the contact area.

* * * * *